United States Patent
Chen et al.

(10) Patent No.: US 11,288,789 B1
(45) Date of Patent: Mar. 29, 2022

(54) SYSTEMS AND METHODS FOR REPAIRING A DAMAGED VEHICLE USING IMAGE PROCESSING

(71) Applicant: CCC INTELLIGENT SOLUTIONS INC., Chicago, IL (US)

(72) Inventors: Ke Chen, Chicago, IL (US); John L. Haller, Valencia, CA (US); Takeo Kanade, Sasayama (JP); Athinodoros S. Georghiades, Strovolos (CY)

(73) Assignee: CCC INTELLIGENT SOLUTIONS INC., Chicago, IL (US)

( * ) Notice: Subject to any disclaimer, the term of this patent is extended or adjusted under 35 U.S.C. 154(b) by 913 days.

(21) Appl. No.: 15/160,448

(22) Filed: May 20, 2016

(51) Int. Cl.
| | |
|---|---|
| *G06T 7/00* | (2017.01) |
| *G06T 15/20* | (2011.01) |
| *G06Q 40/08* | (2012.01) |
| *G06Q 30/02* | (2012.01) |

(52) U.S. Cl.
CPC ....... *G06T 7/0008* (2013.01); *G06Q 30/0283* (2013.01); *G06Q 40/08* (2013.01); *G06T 7/001* (2013.01); *G06T 7/0026* (2013.01); *G06T 7/0032* (2013.01); *G06T 15/205* (2013.01);
(Continued)

(58) Field of Classification Search
None
See application file for complete search history.

(56) References Cited

U.S. PATENT DOCUMENTS

| | | | |
|---|---|---|---|
| 5,490,221 A | * | 2/1996 | Ransford ............... G06F 19/321 |
| | | | 382/130 |
| 8,170,280 B2 | | 5/2012 | Zhao et al. |
| 8,744,133 B1 | | 6/2014 | Troy et al. |

(Continued)

FOREIGN PATENT DOCUMENTS

| CN | 10533571 A | * | 2/2016 | ......... G06K 9/00825 |
|---|---|---|---|---|

OTHER PUBLICATIONS

Volodymyr Tuchenko et al., "A Deep Convolutional Auto-Encoder with Pooling—Unpooling Layers in Caffe", https://www.researchgate.net/publication/312520968_A_Deep_Convolutional_Auto-Encoder_with_Pooling_-_Unpooling_Layers_in_Caffe (Jan. 2017) (Year: 2017).*

(Continued)

*Primary Examiner* — Paul R Fisher
(74) *Attorney, Agent, or Firm* — Marshall, Gerstein & Borun LLP

(57) ABSTRACT

An image processing system and method obtains one or more source images in which a damaged vehicle is represented, and performs one or more image processing techniques on the obtained images to determine, predict, estimate, and/or detect damage that has occurred at various locations on the vehicle. Specifically, the system/method generates damage parameter values based on the image-processed images, where each value corresponds to damage at a particular location on the vehicle. The image processing techniques may include generating a composite image of the damaged vehicle, aligning and/or isolating the image, applying convolutional neural network techniques to the image to generate the damage parameter values, etc. Based on the generated values, the image processing system/method determines, predicts, estimates, and/or selects a set of parts that are needed to repair the vehicle and, in some embodiments, orders the parts needed to repair the vehicle.

20 Claims, 18 Drawing Sheets

(52) U.S. Cl.
CPC ............... *G06T 2207/20024* (2013.01); *G06T 2207/30252* (2013.01)

(56) References Cited

U.S. PATENT DOCUMENTS

| | | | |
|---|---|---|---|
| 9,186,793 B1* | 11/2015 | Meier | B60K 11/02 |
| 9,218,626 B1 | 12/2015 | Haller, Jr. et al. | |
| 9,495,764 B1* | 11/2016 | Boardman | G06T 7/62 |
| 9,824,453 B1* | 11/2017 | Collins | G06F 16/5838 |
| 9,886,771 B1* | 2/2018 | Chen | G06F 3/04845 |
| 10,319,094 B1* | 6/2019 | Chen | G06F 3/0484 |
| 10,636,148 B1* | 4/2020 | Chen | G06T 19/20 |
| 10,657,647 B1* | 5/2020 | Chen | G06T 7/0046 |
| 10,706,321 B1* | 7/2020 | Chen | G06T 3/4007 |
| 10,740,891 B1* | 8/2020 | Chen | G06T 7/001 |
| 2003/0194124 A1 | 10/2003 | Suzuki et al. | |
| 2004/0245485 A1* | 12/2004 | Sari-Sarraf | D06H 3/08 250/559.06 |
| 2006/0167630 A1 | 7/2006 | Noma et al. | |
| 2011/0228981 A1 | 9/2011 | Harres et al. | |
| 2012/0020526 A1* | 1/2012 | Teti | G06T 7/0004 382/104 |
| 2012/0297337 A1* | 11/2012 | St. Denis | G08G 1/168 715/810 |
| 2013/0317864 A1 | 11/2013 | Tofte et al. | |
| 2013/0317865 A1 | 11/2013 | Tofte et al. | |
| 2014/0229316 A1* | 8/2014 | Brandon | G06Q 50/30 705/26.4 |
| 2014/0270480 A1 | 9/2014 | Boardman et al. | |
| 2014/0313334 A1* | 10/2014 | Slotky | G01N 21/9515 348/148 |
| 2015/0109443 A1 | 4/2015 | Nichols et al. | |
| 2015/0112182 A1* | 4/2015 | Sharma | A61B 5/0261 600/408 |
| 2015/0139498 A1* | 5/2015 | Rotatori | G01M 17/027 382/104 |
| 2015/0213556 A1 | 7/2015 | Haller, Jr. | |
| 2015/0317739 A1 | 11/2015 | Lawlor et al. | |
| 2015/0356374 A1 | 12/2015 | Mase | |
| 2016/0174902 A1 | 6/2016 | Georgescu et al. | |
| 2016/0210734 A1* | 7/2016 | Kass | G06F 16/5838 |
| 2016/0259994 A1* | 9/2016 | Ravindran | G06N 3/08 |
| 2016/0335795 A1 | 11/2016 | Flynn et al. | |
| 2017/0068756 A1 | 3/2017 | Wilsher | |
| 2017/0132472 A1 | 5/2017 | Tao et al. | |
| 2017/0169369 A1 | 6/2017 | Garnavi et al. | |
| 2017/0270650 A1 | 9/2017 | Howe et al. | |
| 2017/0293894 A1* | 10/2017 | Taliwal | G06K 9/00671 |
| 2017/0352100 A1* | 12/2017 | Shreve | G06K 9/00664 |

OTHER PUBLICATIONS

D. Yang, S. Zhang, Z. Yan, C. Tan, K. Li and D. Metaxas, "Automated anatomical landmark detection ondistal femur surface using convolutional neural network," 2015 IEEE 12th International Symposium on Biomedical Imaging (ISBI), 2015, pp. 17-21, doi: 10.1109/ISBI.2015.7163806 (Year: 2015).*

"Camera Calibration Toolbox for Matlab," (2000). Retrieved from the Internet at: URL:http://www.ee.oulu.fi/~jth/calibr.

Boddeti et al., "Correlation filters for object alignment." *Proceedings of the IEEE Conference on Computer Vision and Pattern Recognition*. 2013. Retrieved from the Internet at: http://vishnu.boddeti.net/papers/cvpr-2013.pdf.

Heikkila et al., "A four-step camera calibration procedure with implicit image correction." Computer Vision and Pattern Recognition, 1997. Proceedings., 1997 IEEE Computer Society Conference on. IEEE, 1997. Retrieved from the Internet at: http://www.vision.caltech.edu/bouquetj/callb_doc/papers/heikkila97.pdf.

Li et al., "A robust shape model for multi-view car alignment." Computer Vision and Pattern Recognition, 2009. CVPR 2009. IEEE Conference on. IEEE, 2009. Retrieved from the Internet at: http://vision.lbl.gov/Conferences/cvpr/Papers/data/papers/0317.pdf.

U.S. Appl. No. 12/792,104, entitled "Systems and Methods of Predicting Vehicle Claim Cost", filed Jun. 2, 2010.

U.S. Appl. No. 14/168,327, entitled "Systems and Methods of Predicting Vehicle Claim Re-Inspections", filed Jan. 30, 2014.

U.S. Appl. No. 14/168,345, entitled "System and Method of Predicting a Vehicle Claim Supplement between an Insurance Carrier and a Repair Facility", filed Jan. 30, 2014.

U.S. Appl. No. 14/218,148, entitled "System and Method of Predicting Vehicle Claim Information based on Deformation Images", filed Mar. 18, 2014.

U.S. Appl. No. 14/218,165, entitled "System and Method of Predicting Vehicle Claim Information Based on Image Attributes", filed Mar. 18, 2014.

U.S. Appl. No. 14/460,907, entitled "System and Method of Predicting Vehicle Claim Information based on Image Attributes", filed Aug. 15, 2014.

U.S. Appl. No. 15/016,756, entitled "Imaging Processing System for Identifying Parts for Repairing a Vehicle", filed Feb. 5, 2016.

U.S. Appl. No. 15/079,356, entitled "Image Processing System for Vehicle Damage", filed Mar. 24, 2016.

U.S. Appl. No. 15/079,380, entitled "Image Processing System for Vehicle Damage", filed Mar. 24, 2016.

Jayawardena, "Image Based Automatic Vehicle Damage Detection," The Australian National University (2013).

Office Action for U.S. Appl. No. 15/160,384, dated May 4, 2017.

* cited by examiner

SYSTEMS AND METHODS FOR REPAIRING A DAMAGED VEHICLE USING IMAGE PROCESSING

TECHNICAL FIELD

This patent relates to an image processing system and technique, and more particularly, to an image processing system and methodology that detects changes to objects caused by, for example, degradation or damage to the object caused by external or internal forces.

DESCRIPTION OF THE RELATED ART

Image processing systems typically operate on images, such as photos, digital images, etc., to enhance the image in some manner or to detect certain features or characteristics of an image, such as to determine information about objects in the image, to recognize persons or things in the image, etc. For example, there are many image processing system that perform character or facial recognition in images to identify text, people, particular buildings, or other features of objects within images in order to automatically identify people, objects, or other features depicted within the image. In many cases, these image processing systems use statistical processing techniques to detect particular features or characteristics of the set of pixels that make up a feature based on the similarity of the characteristics of the image pixels to other images of the same or similar object, feature, etc. being detected. In other cases, image processing systems look for and detect defects in the image caused by the camera, such as red eye detection, distortion detection, color balance detection, etc., all with the goal of correcting or altering the image to make the image a better or more realistic image. As a further example, some image processing systems operate to perform edge detection to detect objects within an image, to filter images in various manners to reduce or enhance particular features of the image, etc. The goal of most of these image processing systems is to create a better or more useful image, or to detect features within the image for some other purpose.

However, currently, there is no known image processing system that can quickly and effectively detect changes that have occurred to an object as depicted in an image to thereby detect the manner in which an object depicted in the image has changed from a known state or condition. For example, known image processing systems are unable to quickly and effectively detect, isolate, or quantify damage that may have occurred to an automobile in an accident, changes to buildings or other structure that may have occurred due to further construction on the buildings, due to tornado or flood damage, etc. While it is possible to compare images of the same object at different times to detect changes to the image of the object, it is difficult to automatically detect or quantify actual changes to the object based on this comparison of the images for a number of reasons. In particular, such a comparison requires the images of the object to be from the same perspective, angle, distance, etc. which is difficult to achieve in practice. Moreover, a high fidelity comparison would normally require that the images be obtained from the same camera to account for distortions that would typically be introduced by different cameras taking images at different times. Still further, a simple comparison of images of the same object from the same perspective and using the same camera may still result in the detection of changes that are not substantive in nature due to differences in lighting, surrounding objects, etc. Moreover, it would be difficult to quantify the nature or type of changes even if such changes could be detected.

SUMMARY

An image processing system that can be used to detect changes in objects, such as to detect damage to automobiles, buildings, and the like, compares a base object model which depicts the object in an expected or pre-changed condition to one or more target images of the object in the changed condition to thereby detect and/or quantify changes to the object as depicted in the one or more target images. More particularly, the image processing system stores a set of base object models, which may each be, for example, a three dimensional model of an object to which change detection is to be applied. Each base object model may include a plurality of landmarks defined therein, which each landmark defining a particular point or spot on the base object.

Thereafter, the image processing system processes one or more target object images to detect changes to the target object as depicted within the target object images, with each of the target object images being an image of the target object after a change has potentially occurred to the target object. The image processing system may detect one or more of the predefined landmarks in each of the target object images using a difference or correlation filter, for example, and may estimate the position of one or more of the other predefined landmarks based on the position of the detected landmarks and the known position of those landmarks in the base object model. Next, the image processing system corrects for camera and positional distortions by, for example, determining a camera model for each of the target images based on the detected and/or estimated landmarks within the target object images. Using the camera model, the image processing system corrects the target object images for distortions and aligns the base object model with each of the target object images to produce one or more base object images in which the base object is aligned with (e.g., viewed from the same perspective, distance, etc.) the target object as depicted in the distortion corrected target object images.

Thereafter, the image processing system determines the contours (e.g., three dimensional contours) of the target object or of various components of the target object within the target object images by overlaying or superimposing the aligned base object model or images with the target object images. The image processing system may then, using the contours of the target object as defined in the base object model, identify the same components in the aligned target object image and may delete or remove background pixels or other extraneous information based on this comparison. The image processing system may next perform a statistical processing routine on each of the identified target object image components, such as a deep learning technique, like one that uses one or more convolutional neural networks, to detect changes, the likelihood of changes, and/or a quantification of an amount or type of change, to each such body component of the target object as depicted in the target object images. Such change detections may then be used for other purposes to, for example, estimate repair costs, estimate the amount of change that has occurred in the object, estimate the amount of time or effort needed to correct or fix the change, etc. Still further, in one case, the change determination may be displayed to a user in the form of a heat map that illustrates areas of the target object that have undergone change, the amount of such change, the type of such change, etc.

In an embodiment, a method performed by an image processing system includes obtaining a source image that includes an image of a damaged vehicle, and applying, by a computing device included in the image processing system, an image processor component of the image processing system to the source image to thereby generate a set of values corresponding to damage to the vehicle. Each value included in the set of values respectively corresponds to respective damage at a respective location on a respective segment of the vehicle, and each value may be indicative of a determined degree of severity of damage to the respective location, a level of accuracy of the determined degree of severity of damage at the respective location, a type of damage at the respective location, and/or a likelihood of an occurrence of damage at the respective location. Additionally, the method includes determining, by the computing device from a set of vehicle parts of the vehicle, one or more parts needed to repair the vehicle. The determination of the one or more parts needed to repair the vehicle is based on one or more particular values included in the set of values generated by the image processor component. The method further includes generating an indication of the one or more parts needed to repair the vehicle, and providing the indication to at least one of a user interface or another computing device. In some implementations, the method additionally includes ordering the one or more parts needed to repair the vehicle.

In an embodiment, an image processing system includes an interface via which one or more source images are obtained. Each of the one or more source images includes therein a respective image or representation of the damaged vehicle. The image processing system further includes an image processing component that applies one or more image processing techniques to the obtained source images to thereby generate a set of values corresponding to damage to the vehicle. Each value included in the set of values respectively corresponds to respective damage at a respective location on a respective segment of the vehicle, and each value may be indicative of a determined degree of severity of damage to the respective location, a level of accuracy of the determined degree of severity of damage at the respective location, a type of damage at the respective location, or a likelihood of an occurrence of damage at the respective location. The image processing techniques utilized by the image processing component may include, for example, generating a composite image from a plurality of source images; aligning the composite image and/or one or more of the source images with an image, representation, or model of a corresponding vehicle that does not include the damage incurred by the damaged vehicle or that is not damaged; isolating an image or representation of the damaged vehicle from a remainder of the composite image and/or from a remainder of one or more source images; applying one or more convolutional neural networks to one or more portions of a representation of the damaged vehicle to generate respective damage parameter values; and/or other image processing techniques. One or more of the image processing techniques utilized by the image processing component may be based on historical image data, damage data, parts data, and/or repair data that is stored in one or more memories accessible to the image processing system.

Additionally, the image processing system is configured to determine, from a set of vehicle parts for the vehicle, one or more parts that are needed to repair the vehicle, where said determination is based on one or more particular values of the set of values generated by the image processor component. In some implementations, said determination is also based on historical parts data, damaged data, claim data, and/or repair data that is stored in one or more memories accessible to the image processing system. The image processing system is further configured to generate an indication of the one or more parts needed to repair the vehicle, and to provide indication to a user interface and/or another computing device. In some configurations, the image processing system orders the one or more parts needed to pair the vehicle.

DETAILED DESCRIPTION

Figure 1:
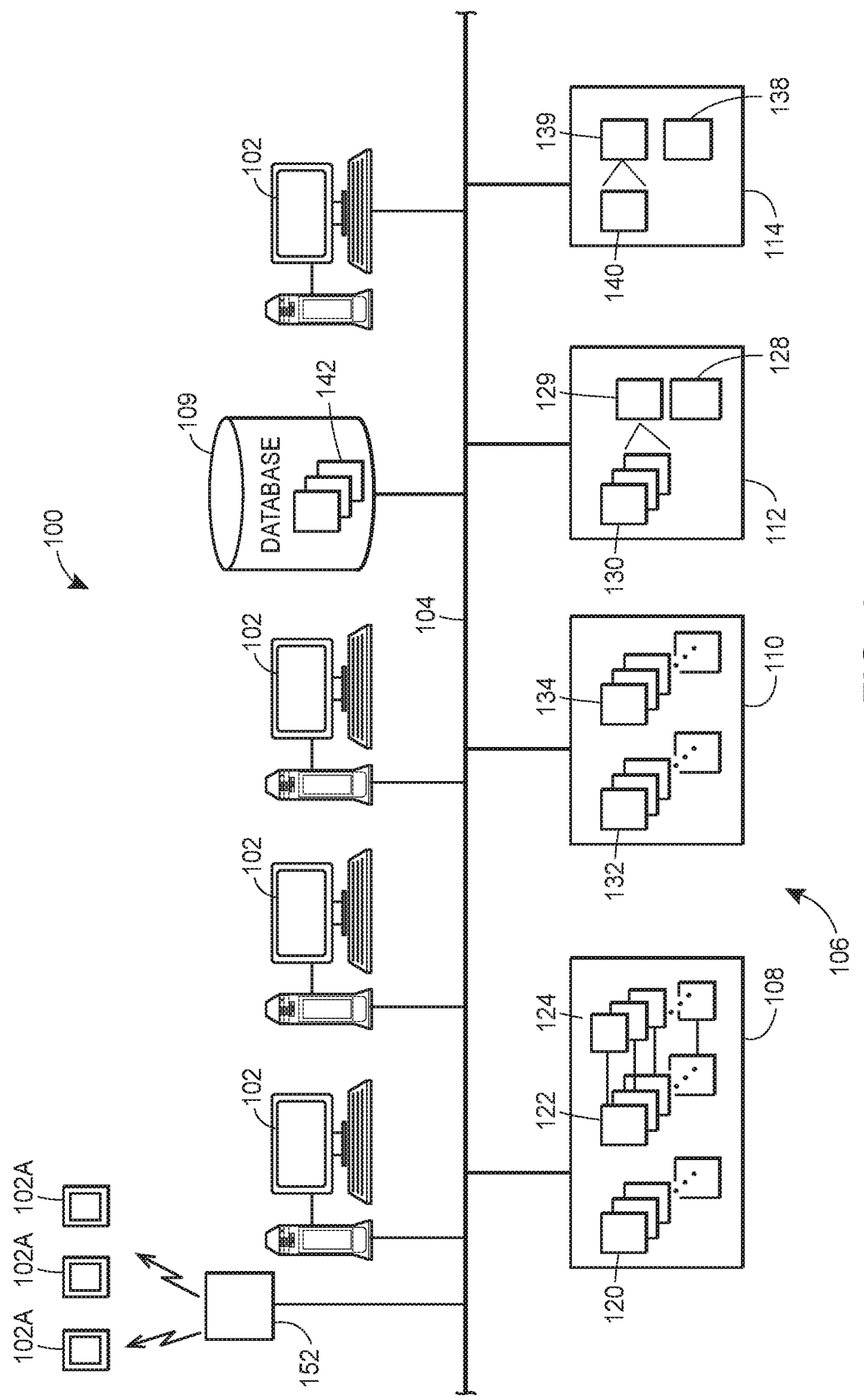
FIG. 1 depicts an exemplary image processing system that can be used to detect changes in objects, such as to detect damage to automobiles, buildings, and the like, and to use these detected changes to determine secondary features.

FIG. 1 illustrates one example of an image processing system 100 which may be used to determine changes to a target object, automatically or semi-automatically, generally by determining differences between one or more images of the target object as changed and one or more images generated from a base model of the object representing the object prior to the changes occurring to the object. After changes to the target object have been determined and quantified in some manner, further processing systems, which may be incorporated into the image processing system 100, may be used to determine secondary characteristics or features associated with the target object, such as the amount of change or damage to the target object (assuming that the changes to the object represent damage), costs associated with repairing or replacing the target object, the time it may take to repair the target object, the progress the target object has undergone in changing states, etc.

As illustrated in FIG. 1, the image processing system 100 may include various user interface devices 102, which may be general purpose computers, handheld devices, workstations, etc., connected through one or more communication networks 104, to one or more further computing devices 106 which may operate as servers and/or databases in a traditional client-server or cloud-based network. For example, the further computing devices or servers 106 may include one or more databases 108, 109, and 110, and one or more servers 112 and 114 having computer processing and storage capabilities.

In this case, the database 108 may store one or more base object models 120 (which may be, for example, two dimensional and/or three dimensional object models) defining or depicting one or more base objects upon which change detection image processing may be performed. Moreover, the database 108 may store changed or example target image files 122, which may be files that include images of changed target objects illustrating various manners in which changes to the base objects within the base object models 120 may occur. Still further, the database 108 may store information files 124 relating to or providing specific information about each of the changed target image files 122 or the changed objects within the changed target image files 122. In one example, in which the image processing system 100 may be used to detect changes to automobiles, such as to detect damage caused to an automobile in an accident, the base object models 120 may be three dimensional (or two dimensional) models of various automobiles upon which changes may be detected. Generally in this case, a different base object model 120 will be stored for each make/model/year or make/model/year/trim-type of automobile that is to be analyzed for damage. Still further, in this example, each of the changed image files 122 may include one or more images of a damaged vehicle (conforming to one of the make/model/year types, for example, of the base object models 120 stored in the database 108). Generally, each such changed image file 122 may include digital photos taken of a particular automobile that has been damaged in, for example, an accident. Such photos may be collected by, for example, owners of the automobiles depicted in the photos, an automobile insurer against whom an insurance claim was made for repairing or replacing the damaged automobile, etc. Still further, each of the information files 124 may store information pertaining to the damaged automobiles in one of the changed target image files 122, such as the make/model/year and trim-type of the damaged automobile, the country, state, city, zip code, and/or other geographical region in which the automobile was insured or damaged, the mileage of the damaged automobile, the color of the damaged automobile, the type of or location of the damage to the automobile, telematics data obtained from or about the damaged automobile associated with the accident, the parts which needed to be repaired or replaced as a result of the damage, the cost of repair or replacement of each such part, the type of damage to each such part, whether the automobile was considered a total loss as a result of the damage, the cost of repair of the automobile if the automobile was repaired, the insurer of the automobile, if any re-inspection was performed on the automobile during repair, capitation of the automobile, etc. Of course, other information could be stored for any or all of the changed target image files 122, and the type of information stored for each of the changed target image files 122 may vary depending on use, the type of object upon which change detection is to be performed, etc. As will be described in more detail herein, the base object models 120, the changed target image files 122, and the information files 124 may be used by the image processing system 100, for example, to perform primary and secondary processing on photographs of a newly damaged automobile to determine the type of and/or the extent of damage (change) to the damaged automobile.

The server 112, which may include a microprocessor 128 and a computer readable memory 129, may store one or more image processing training routines 130. The training routines 130 may be implemented on the microprocessor 128 using the base object models 120, and the images and data within the files 122 and 124 to generate various other components used in a further image processing routine that operates to determine changes to target objects (which are represented by one of the base object models 120) on which changes have occurred but for which changes have not been quantified. In one example, one or more of the training routines 130 may determine a set of correlation filters 132 (also referred to as difference filters) for each of the target objects, and one or more of the training routines 130 may determine a set of convolutional neural networks (CNNs) 134 for the objects represented by each of the base object models 120. The correlation filters 132 and the CNNs 134 are illustrated in FIG. 1 as being stored in the database 110, but these components could be stored in other memories associated with the image processing system 100 if desired.

Thus, generally speaking, and as will be described in further detail herein, the image training routines 130 use the base object models 120, the changed image files 122, and the image information files 124 to produce and/or select the correlation filters 132 and the CNNs 134, in one example, that will be used by the image processing system 100 to detect changes to target objects (such as to detect damage to automobiles or other vehicles) based on images of the target objects, such as based on photographs of damaged automobiles. In one example, the image training routines 130 may calculate, for each of the base object models 120, a set of correlation filters 132 and a set of CNNs 134 based on the training set of data in the changed target image files 122, and these tools 132 and 134 may be stored and then later used to detect damages on images of target objects for which changes to the target objects (such as damage to the target object) is unknown or not quantified.

Moreover, as illustrated in FIG. 1, the server 114, may include a microprocessor 138 and a memory 139 that stores an image processing routine 140 that may perform image processing on a set of target images 142, which images depict a target object represented by one of the base object models 120, but upon which change has occurred, to thereby detect changes to the target object, such as to detect or quantify damage to the target object. In this case, the images 142, which may be stored in the database 109 for example, represent the target object as changed or altered with respect to the same object as represented by one of the base object models 120. Generally speaking, the image processing routine 140 may use the base object model 120 corresponding to the target object, the correlation filters 132 and the CNNs 134 (as stored in the database or memory 110) corresponding to that base object model 120, as well as the set of target images 142 for the target object to detect changes that have occurred to the target object, where the changes are represented or depicted within the set of target images 142 of the target object.

During operation, a user may log onto or access the system 100 via one of the user interfaces 102, may upload or store a new set of images 142 of a target object in the database 109, and may additionally provide or store information in the database 109 related to the new set of images 142, such as an identification of the target object within the new set of images 142 (e.g., the year/make/model of a damaged automobile depicted in the images), information about the target object (such as vehicle mileage, location or geographical region of the automobile, etc.), as well as any other desired information about the images 142 or the target object within the images 142, such as telematics data collected by the automobile depicted in the photographs, first notice of loss information as collected by the insurance carrier of the automobile depicted in the photographs, an indication of the angle or perspective at which the object is depicted in the photograph, etc. The user may then initiate the image processing routine 140 to operate on the new set of target images 142 to detect changes within the target object depicted in the new set of target images 142 as compared to the base object model 120 for that same object. Of course, the new set of target images 142, along with information related to the new set of target images 142, may be stored in the database 109 and/or provided to the database 109 in other manners, such as via a direct or indirect connection to a camera, via another device in the communication network(s) 104, e.g., via a handheld device 102A connected to the network(s) 104 via a wireless interface 152, etc. Moreover, if desired, a user may use one of the user interfaces 102, 102A to additionally or alternatively select a sub-set of a series of images that have been previously collected or taken of the target object, such as different views of the target object from different angles, and may provide these images to the database 109 or may mark these images in the database 109 for use as and/or inclusion in the new set of target images 142 to be processed by the image processing routine 140.

Generally speaking, once initiated, the image processing routine 140 will operate to detect changes to the target object depicted in the new set of target images 142 as compared to the target object as represented by a base object model 120 for that same object to, for example, detect and quantify changes to the target object, such as damage to the target object. Generally speaking, the image processing routine 140 will use the correlation filters 132 and the CNNs 134 to detect differences between the target object depicted in the new set of target images 142 and information about the target object as stored in the base object model of the object 120 to determine an amount of, or a quantification of change, such as damage, to the target object as depicted in the target images 142. The image processing routine 140 may then may provide this change detection information to the user via one of the user interfaces 102, 102A in any of various different manners. More particularly, the image processing routine 140 uses the correlation filters 132 or other difference filters to detect one or more predetermined landmarks (of or on the target object) in each of the target images 142 and uses these landmarks to detect the positioning, orientation, depth of field, etc. of the target object as captured in the target images 142. The image processing routine 140 then uses these landmarks to perform a multi-dimensional alignment between the base object model 120 (associated with the target object depicted in the target images 142) and the target object as actually depicted in the target images 142. Such a multi-dimensional alignment may include matching or aligning the three dimensional orientation and depth of field or other positioning of the target object as depicted in one or more of the images 142 with the base object model 120. This multi-dimensional alignment may also include detecting and correcting for camera distortion introduced into the target images 142 by the camera that took those images. In one case, the image processing routine 140 may then generate one or more images of the target object from the base object model 120 that are aligned with the target object as depicted in the target images 142, and uses these aligned images to detect and eliminate background information in the target images 142 as well as to detect various components or parts of the target object as depicted in the images 142. In another embodiment, the image processing routine 140 may use the landmarks to create a composite image or model of the target object from the set of target images, enabling the target object, as depicted in the target images, to be modeled in, for example, three dimensions and thereby be rotated, zoomed into and out of, etc. This model of the target object may then be aligned with the base object model 120 to enable comparisons between the two objects.

Thereafter, the image processing routine 140 uses the CNNs 134 to detect change parameters for each of the various components or parts of the target object as depicted in the images 142 or the composite target object model created from the images 142. Such change parameters may include, for example, indications of points or areas of change (e.g., damage), the probability of change at each point or area, the severity of change at each point or area, the type of change at each point or area, etc. These change parameters may then be used to display a heat map to the user, wherein the heat map is indicative of, corresponds to, and/or defines the areas of change to the target object depicted in the target object images 142 as compared to the same object as defined by the base object model 120. Likewise, these change parameters may be used to determine secondary factors or features associated with the target object, such as cost to repair the changes, the estimated time it will take to repair the changes, an indication of a degree of metamorphosis of the object from one state or condition to another state or condition, etc. To initially set up the image processing routine 140 for use in detecting changes to particular objects, such as to detect damage of a particular type of object (e.g., as represented by a particular base object model 120), the same or a different user may access the training routines 130 via one of the user interfaces 102, 102A and may execute the training routines 130 to create the correlation filters 132 and the CNNs 134 needed for the image processing routine 140 for the particular object to be analyzed. Thereafter, these tools 132 and 134 may be stored in the database 110 for example, for later use by the image processing routine 140. Generally speaking, the training routine 130 will access the base object model 120 for a particular object as well as a training set of data associated with the base object model 120 (e.g., a training set of images stored in the associated changed target image files 122 and the information about these objects as stored in the associated information files 124), and will process the training set of data as compared to the base object model 120 for the object to determine a set of processing tools needed by the routine 140, including for example, the correlation filters 132 and the CNNs 134. The training routine 130 may then store these processing tools in the database 110 for later use by the processing routine 140.

While it will be understood that the image processing system 100 of FIG. 1 is illustrated as a hardwired system having various servers and databases 106 connected to various user interfaces 102 via a hardwired communication network 104, other processing and communication configurations could be used as well or instead. For example, the network 104 could be a wireless communication network, or could be a combined wired and wireless communication network, and the network 104 may include any type of communication network, including a public local area network (LAN) or wide area network (WAN), a private LAN or WAN, a set of direct communication connections, etc. Moreover, the network 104 may include or use the Internet or the World Wide Web, to enable users at the user interfaces 102 and 102A to communicate with the servers and databases 106 via an Internet connection to upload photos or images of a target object for which change is to be detected to the database 109, to initiate the image processing routines 130 or 140, to view the results of the routine 140, etc. Still further, while the servers and databases 106 are illustrated in FIG. 1 as including five different devices that have different information stored therein, any number of servers, databases, and/or other computing devices could be used and, in fact, the elements illustrated in the servers and databases 106 of FIG. 1 could be stored within or distributed among more or less than five devices. For example, these components could be all stored in the same computer processing device, which could be the same computer processing device as one of the user interfaces 102 or 102A. In another example, at least some (or all) of these components could be implemented using a computing cloud architecture. Thus, the architecture of the image processing system 100 of FIG. 1 could be changed to include more or less computer devices connected in various different manners and still function as described herein.

Figure 2:
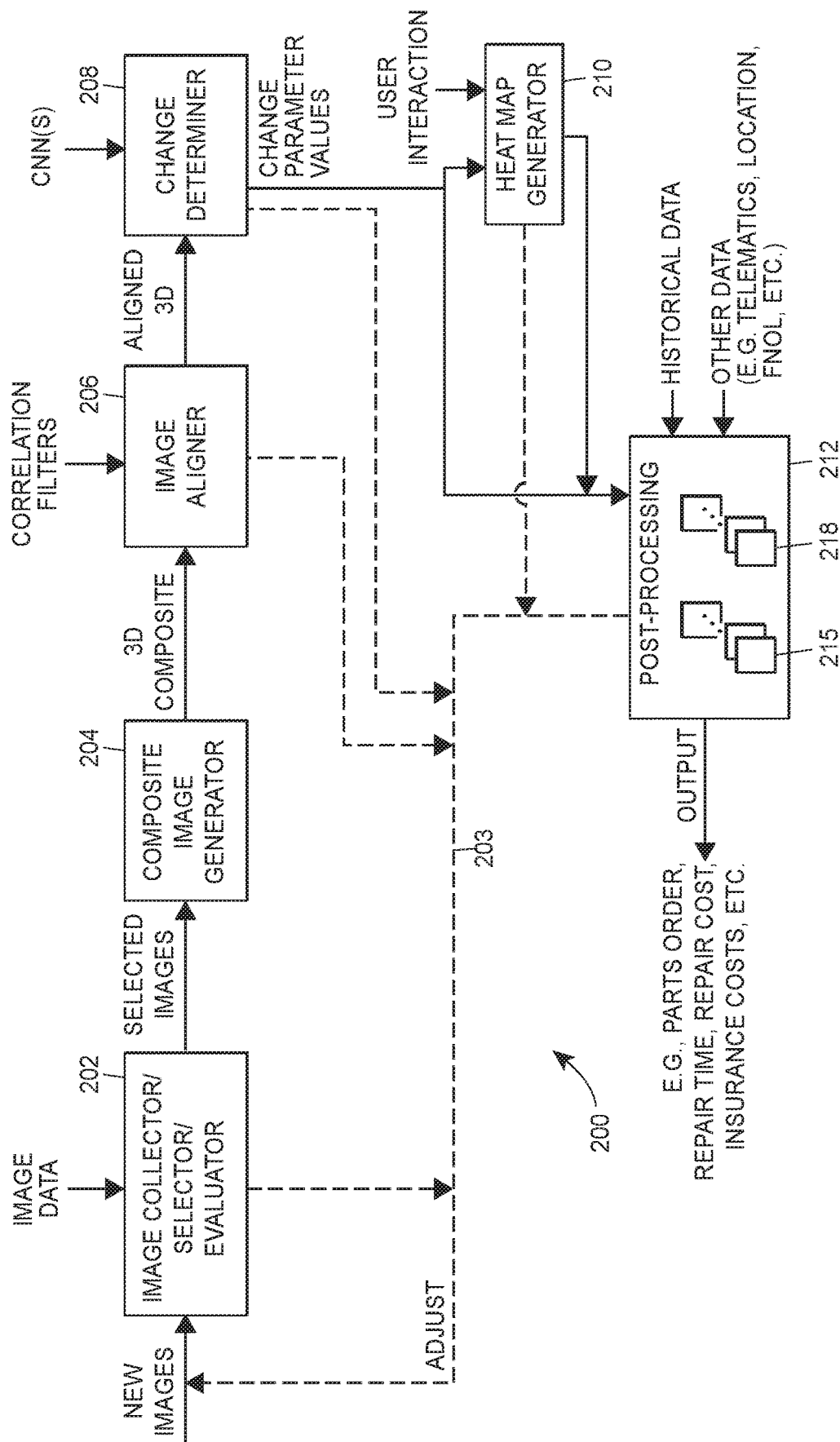
FIG. 2 depicts a block diagram of an exemplary image processing system and technique that may be used to detect changes to an object, such as to detect changes to a vehicle.

FIG. 2 depicts a block diagram 200 of a system and/or method that may implemented using the image processing algorithm or routines 130 and 140 of FIG. 1 to detect changes in a target object based on images of the target object and a base object model associated with the target object. In particular, a block 202 collects images of the target object on which or for changes are to be detected and quantified in some manner, such as images of a damaged automobile that are to be analyzed to determine the extent of or nature of the damage thereto. The image collector block 202 may, as indicated in FIG. 2, receive raw images of the target object (also referred to interchangeably herein as "source images") on which change detection is to occur, e.g., from a user, a database, or any other source. Such images may include still image or video images, and/or may include two-dimensional and/or three-dimensional images. Moreover, in some cases, the image collector block 202 may perform some processing on the collected images to select images that are of higher quality or that are better suited for use in processing by the image processing routine 140 to detect changes to the target object depicted in the image as compared to a base object model of the target object. For example, the block 202 may collect information about the target object depicted in the target images (such as the make/model/year of an automobile in the images, mileage of the automobile, trim type of the automobile, location or region of the automobile, etc.), and the block 202 may collect data about the images themselves, e.g., an indication of the perspective of the object captured in each image (such as whether an image depicts a front view, a side view, a corner view, a top view, a bottom view of the object, etc.). Likewise, the block 202 may receive other information about the nature of changes to the target object or indicating information that indicates potential changes to the target object. For example, when analyzing damaged automobiles, the block 202 may receive telematics information collected from the automobile during the accident in which the damage was incurred, which information may be used to infer where damage generally was likely to have occurred on the automobile as depicted in the target images. In other cases, the block 202 may receive indications of where damage occurred to the automobile or other object as inputs from a user, such as the owner of the automobile, from insurance claims information, etc. In one example, the block 202 may receive first notice of loss (FNOL) information, which is generally information collected by an insurance carrier at the first notice of loss, e.g., when the owner first notifies the carrier of a claim or a potential claim. Standard FNOL data may include, for example, vehicle year, make, model, and trim type, vehicle telematics data such as a primary impact code, a secondary impact code, a drivable code, an airbag code, etc., vehicle odometer reading, vehicle state (zip code), vehicle insurance company, etc.

In any event, the block 202 may select a subset of the raw images of the target object to use in processing to determine or quantify the change to the target object as compared to the base object model for the target object. If not enough images, or if images of the right type or quality, have not been collected, the block 202 may provide feedback to a user (via a user interface 102 of FIG. 1, for example) that additional images of the target object are needed for change processing. This operation is indicated by the dotted lines 203 in FIG. 2. Such an indication may include a request for more images of the target object, a request for images of the target object from a particular angle or perspective, distance, etc.

Next, when a set of new images has been collected/selected for a target object to be analyzed for changes, such as for damage, a block 204 determines a base object model (i.e., one of the base object models 120 of FIG. 1) to use in the change detection processing. As an example, the block 204, when analyzing images of an automobile for damage, may determine the make/model/year of the automobile within the collected images and may obtain a base object model 120 for that make/model/year from the database 108 of FIG. 1. As generally indicated above, the base object model 120 may be a three dimensional model of the object that, for example, defines the three dimensional contours or shape of the object in its pristine or pre-changed condition.

In other cases, the base object model 120 may be a set of two dimensional models (e.g., images) that define different views of a three dimensional object, as well as information defining the exact view (e.g., the angle, the distance, etc. of the object from the focal point of the camera) of the object within the images. In cases in which the object being analyzed is a two dimensional object or may be represented adequately as a two dimensional object, one or more two dimensional base object models may be used as a composite base object model. Generally speaking, the block 204 may develop or obtain one or more images from the base object model 120 during further processing, and these images may be used to determine changes to the target object being analyzed (i.e., to the target object depicted in the images selected by the block 202).

Next, a block 206, aligns, on an image by image basis, or on a composite basis, each of the selected images (the set of images 142 of FIG. 1) with one or more images developed from the base object model 120 to enable a comparison between the target object as depicted in the selected images and the base object model. Generally speaking, the block 206 performs multi-dimensional alignment so that images of the object generated from the base object model are aligned in three dimensions with the target object as depicted in the corresponding images of the target object as collected by the block 202. In some cases, the block 206 may use the correlation filters 132 of FIG. 1 to perform this alignment in a manner described in more detail herein. However, generally speaking, for each of the selected images, the block 206 produces an image from the base object model that matches or aligns with the orientation of the target object as depicted in the selected image. On the other hand, if desired, the block 206 may process the selected image to reorient the target object within the selected image to align with a particular image generated from the base object model or with a particular view of the base object model. In other cases, the block 206 may create a composite target object model from the target object images and may align the composite target object model with the base object model. Additionally, the block 206 may correct for camera distortion by determining one or more camera transfer functions (e.g., distortion transfer functions) and applying the one or more transfer functions to the image developed from the base object model or by applying an inverse of the one or more camera transfer functions to the selected images or to the composite target object model to correct the selected images or model. Thus, in one example, the block 206 produces, for each of the selected images (from the block 202), an image of the pristine or unchanged object from the selected base object model, wherein the image of the pristine or unchanged object is aligned with (e.g., oriented in the same manner as) the target object as depicted in the selected image. This alignment can correct for (or be used to match) the camera position (e.g., camera angle), focal length, distance to the target object from the focal point of the camera, etc., to thereby size, scale, and orient the image from the base object model in a manner that is matched in size, scale, and orientation to the target object as depicted in the selected image. Moreover, this alignment may correct for distortion introduced by the camera that took the target object image.

Still further, the block 206 may isolate the target object as depicted in each of the one or more selected images (from the block 202) by eliminating or reducing background effects and/or content, noise, or other image artifacts, such as glare, reflections, etc. in the selected images, to thereby enable a better comparison between the object as depicted in the base object model and the target object as depicted in the selected images. In some cases, the block 206 may apply image filters to remove known types of image artifacts, such as glare, reflections, etc. As such image filtering techniques are well-known, they will not be described in further detail herein.

In some cases, the base object model may have information on or may define parts or components of the object being analyzed. For example, if the object being analyzed is an automobile, the base object model may identify the various body panels of the automobile separately and may generate images of the object with the various components of the object identified, outlined, or isolated. Such an image that is developed from the base object model with various components thereof delineated is referred to herein as a segmented image or a componentized image. Moreover, as illustrated in FIG. 2, the block 206 may operate to detect or determine if more images of the target object are needed to perform change processing thereon. For example, the block 206 may detect that various angles of or components of the target object are not depicted in or detectable from the selected images of the target object and that further images of the target object showing these components are needed to perform a complete change processing routine. Still further, the block 206 may determine that various images as selected by the block 204 are not able to be aligned with the base object model, that the camera distortion is too great, that the image detail of the target object as depicted in a selected image is not high enough (e.g., the object is too far away from the camera or too small within the image) to be processed adequately, etc. In these cases, the block 206 may provide feedback as depicted by the line 203 that more or better images of the target object are needed.

Next, a block 208 may determine the change to the target object as depicted in the selected, aligned, and corrected target object images as compared to the pristine or unchanged object depicted by the base object model. The block 208 may determine where change has occurred, exists, or is likely to exist, and in some cases may determine the extent of the change or even a quantification of the type of change (e.g., damage) that has occurred to the target object as depicted in the selected, aligned, and corrected images of the target object. Generally speaking, the block 208 may overlay the aligned, segmented image developed from the base object model with the corrected image of the target object to enable identification of or detection of the boundaries of the various different components of the target object as depicted in the corrected images of the target object. Moreover, this overlay may be used to eliminate pixel information in the target object image that is not associated with the target object, such as background information or pixels, foreground pixel information, etc. In cases in which the system 200 uses a composite target object model, the block 208 may perform a three-dimensional overlay or comparison between the composite target object model and the base object model. This technique is different than normal edge detection techniques which process the image pixels looking for edges of the object based on the difference or sudden change of pixel values within the image. In this case, the edges of the object components as defined by the base object model are aligned with and overlaid onto the target image to define the edges of these same components in the target object as depicted in the target image. The pixels outside of these edges are then designated as background pixels, not associated with the target object or with the component of the target object.

Thereafter, the block 208 performs change detection image processing on each of the various components of the target object as depicted and identified in the target object images (or the composite target object model), to identify and, in some cases, quantify changes that have occurred to the target object depicted in the target object images. In one case, the block 208 may apply one or more CNNs (such as the CNNs 134 of FIG. 1) to the image areas defined by each of the components of the target object to detect the existence of change, the likelihood of the existence of change, a degree of change, or a quantification of change (e.g., damage) to the target object as depicted in the target object images (or composite target object model). A separate CNN may, for example, be applied to each different component of the target object as depicted in the target object images. As will be understood, a CNN may determine, for each pixel or set of pixels in the image corresponding to a particular component or part of a component, a likelihood of change or damage at that point, an estimate of the likelihood of change or damage at that point, and/or a type or severity of change or damage at that point, and may represent this likelihood of change or other change parameter as a number on a scale, such as a number between 0-99, in which 0 represents no likelihood of change or damage and 99 represents a high likelihood of change or damage. The CNNs may, in some cases, determine a similarity of the analyzed portion of a component of the target object to the object as defined by the base object model.

More specifically, the block 208 may select a CNN that has been developed for a particular component or segment of the base object, and may apply the CNN to each pixel (or every other pixel, or every third pixel, etc.) of the changed or target image that has been identified as being associated with that component or segment, and in doing so may calculate a value for that particular application of the CNN. In some cases, each CNN may define a particular image area (e.g., a four pixel square, a 16 pixel square, a circular section, a rectangular section, etc. of the image) and the pixels of the target image object covered by that area are used as inputs to the CNN. The block 208 may apply a CNN to a particular pixel of the image by, for example, centering the CNN image area over the pixel being analyzed. The pixels of the image that are then coincident with the CNN image area are used as inputs to the CNN, which may have been trained for example to produce an output based on those inputs indicating the likelihood of change at the center pixel. The block 208 may scan the CNN over each pixel of the image (or other area of the image, such as every second pixel, every fifth pixel, etc.) associated with a component of the object to perform a CNN calculation at each of the scanned pixels. If desired, the block 208 may apply one or more CNNs to each of the components of the object as depicted in the target object image and, in some cases, may apply more than one CNN to each of the components of the object.

Thus, to perform damage detection, the block 208 uses each of the target object images (of the changed or damaged vehicle or other target object), in which the target object depicted in the image is isolated, corrected for distortion, and aligned with a segmented image of the base object model. As part of this process, the block 208 uses the aligned, corrected, segmented image of the base object model (or such an image produced from the base object model) to identify object segments or components of the damaged or target object as depicted in the target object images. The block 208 then uses various tools, such as different types of processing routines, to determine various changes, the extent of the changes, and/or potential types of changes, that have occurred to the target object as depicted in the target object images. For example, the determination of changes may include indications of dents, scratches, creases, folds, or other types of damage to a particular component of a vehicle, which may help quantify the extent of the damage to the component of the vehicle.

Still further, as illustrated in FIG. 2 by the dotted line 203, the block 208 may determine that the analysis of change of the target object is indeterminate or of low statistical quality, and may inform the user of this problem, to enable the user to obtain better images of the target object to perform better or more accurate change detection. For example, the results of the change detection on a particular component of a target object may indicate a high likelihood of severe change at all points or at no points, or may fluctuate between high change and low change in a manner that seems unlikely or impossible, etc. These or other analyses may be performed by the block 208 on the change parameters as determined by the block 208 to determine if further or other images of the target object are needed to provide better or more accurate change detection.

If desired, a block 210 may then display indications of the detected changes or change parameters to a user via, for example, one of the user interfaces 102 (or 102A) of FIG. 1. For example, the block 210 may display a heat map of the target object indicating the spots, locations, or areas (e.g., pixels) at which change is detected or is detected to be likely. Such a heat map may be included in, overlaid on, superimposed on, or otherwise applied to an image of the object (such as one of the target object images) wherein different pixels of the target object within the image are displayed using different colors that indicate different degrees of change or likelihood of change to respective spots, locations, or areas of the target object (such as an amount of damage or a likelihood of damage). Such a heat map may be generated using the outputs of the CNNs so that the respective color or appearance of each of the pixels or surface segments of the image that correspond to various components of the object depicted in the image is based on and/or corresponds to a respective CNN output (e.g., to respective values of one or more change parameters). Still further, such a heat map may include change depictions or indications on any number of the selected images (or from an image generated from a composite target object model) to illustrate detected changes to the target object from various different viewpoints or sides of the target object. Still further, the heat map may be used to determine if other or better images of the target object need to be obtained and processed to perform better or more accurate change detection, as illustrated by the dotted line 203. For example, a user may view the heat map and determine that areas of the target object have undergone change or types of change that were not detected by the block 208, indicating that the images of the target object used for change processing were not adequate to detect all of the changes. On the other hand, the user may determine that the block 208 detected changes at points on the target object at which no changed occurred and, once again, may use this knowledge to instruct the system 200 to obtain other or better images of the target object for processing. Additional discussion of heat maps (e.g., block 210) is provided in later sections of the present disclosure Still further, once an indication of the change to a target object is determined by the block 208, a block 212 may use the change indications or the change determinations for the various components of the target object (or the heat map created by the block 210) to determine secondary considerations based on the determined changes. Such secondary considerations might include determining an estimate of the repair costs associated with repairing the target object, the time associated with correcting or fixing the target object based on the changes made to the object, a representation of an amount of metamorphosis (e.g., from one state to another state) that the target object has undergone, etc. The secondary considerations may be used to, for example, order parts for repairing a changed or damaged vehicle, estimate insurance settlements, estimate repair times, etc. Of course, the block 212 may hand off the results of the change estimation and/or the quantification of the change estimation to one or more other routines to perform the secondary considerations based on the detected extent of the changes, type of changes, etc. As indicated in FIG. 2, various types of information or data may be used to perform or determine these secondary considerations, such as historical data related to damaged vehicles (e.g., that may define costs, times, etc. for similar types of detected changes in the target object), telematics data from a vehicle for example on which change processing is being performed, information associated with FNOL of the target vehicle (e.g., location of accident, location of insurance policy, primary impact code, etc.), cost of components of the object from vendors, predictive models, estimating programs, etc. In some embodiments, the block 212 utilizes one or more predictive models 215 that are generated based on the various types of information, and/or utilizes one or more filters 218 to determine these secondary considerations. Additional discussion of post-processing and secondary considerations (e.g., block 212) is provided in later sections of the present disclosure.

Still further, as indicated in FIG. 2 by the dotted line 203, the output of or the calculations performed by any of the blocks 202, 206, 208, 210, and 212 may be used to determine that new or different images of the target object are needed to perform better or more accurate change detection. For example, as noted above, the block 206 may determine that it is not possible to align one or more of the target object images with the base object model and, as such, that new images of the target object are needed. Likewise, the block 206 may determine that it is not possible to correct for distortion in a target object image or to remove background or foreground objects in the image, and that new or better images of the target object are thus needed. Still further, the change detection block 208 may determine that the change determination for a particular image or images is not conclusive or accurate enough, or that it may have a high likelihood of error, and that new images may be needed to perform better change detection processing on the target object. Still further, a user may use a heat map generated by the block 210 to determine that the detected changes to the target object are not accurate or complete, and that new images are needed. Moreover, the block 212 may determine that secondary considerations associated with the detected changes are inaccurate or unlikely to be correct, and that processing on new images of the target object should be performed. In any or all of these cases, the image processing system may optionally ask for or request zoom-in photos of a damaged or changed area of the object to further identify and quantify the damage type/severity, or could ask for or request zoom-out photos if not enough of the object is depicted in a particular photo or target object image or if damage spans to the edge of the image. In some cases, the system could perform 2D/3D registration using the zoom-in (or zoom-out) photos and therefore have better capture of corresponding damages or changes on the target object.

It will be understood that, while the specific discussion of, and the specific example of change processing provided below is directed to detecting damage to an automobile, such as damage caused by an accident in which the automobile was involved, the same or similar image processing techniques may be applied to other types of objects, for detecting other types of changes, including, for example, detecting changes in building structures or buildings, changes to other forms of real property, such as land, crops, etc., as well as to detecting changes to many other types of objects. Moreover, the detected changes do not have to be related to damage to an object but could instead be related to changes based on or that result from a metamorphosis of an object from one state or condition to another state or condition. For example, it may be possible to detect the growth of a set of crops, animals, etc. over time during various stages of development. In one specific example, it may be possible to detect when fruit bearing trees, or crops have ripened to a point that they are ready to be picked or harvested, to detect a state of construction of a building, etc. Still further, it may be possible to detect changes caused to an object in the form of natural aging or erosion of a target object, or changes in the form of damage caused by third parties or even by nature, such as damage caused by tornadoes, wind, rain, floods, etc. Thus, while the following discussion is centered around the detection of damage to an automobile, other types of damage or other type of changes to automobiles or other types of objects may be detected using the same or similar procedures.

Figure 3:
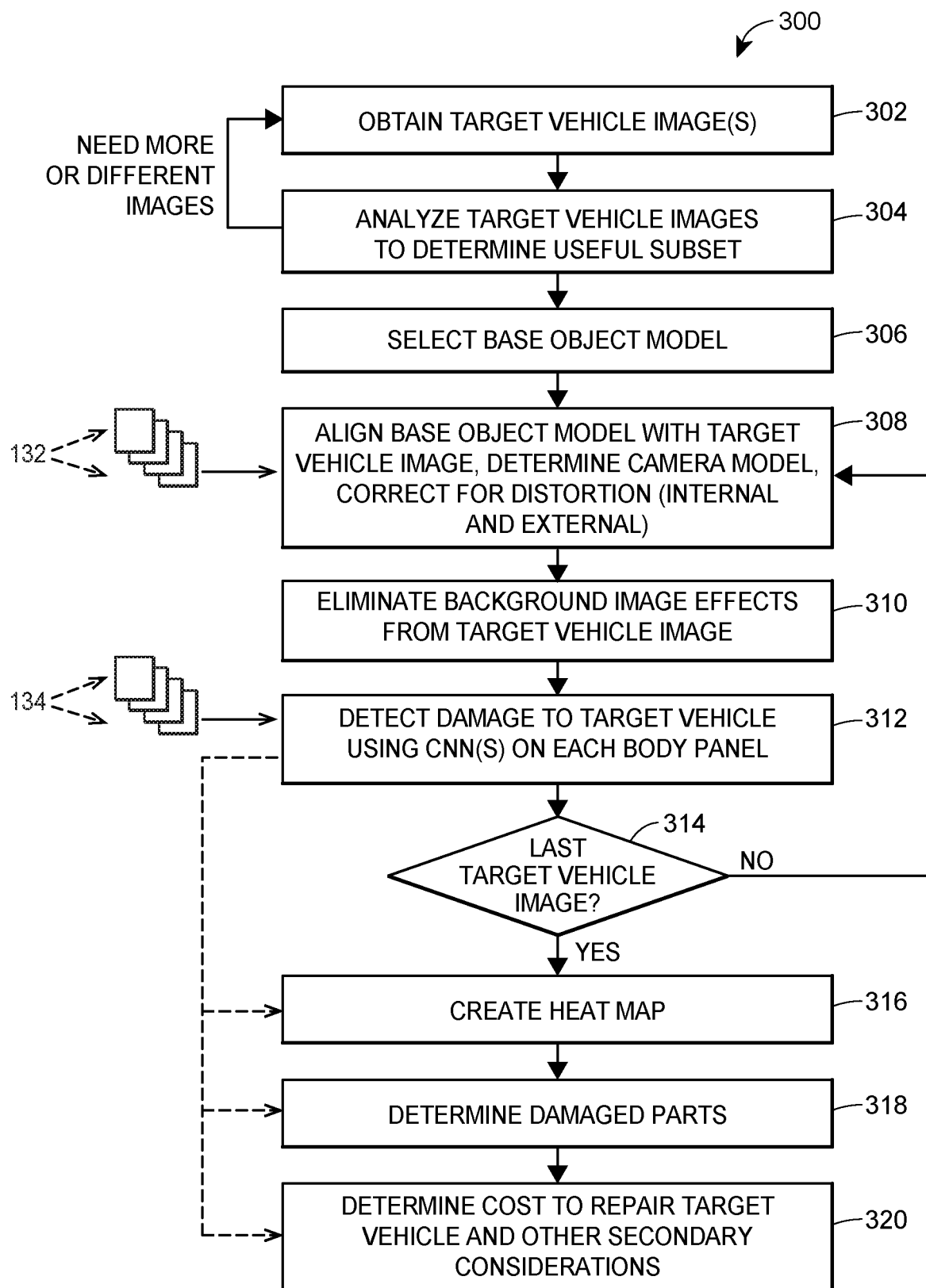
FIG. 3 depicts a block diagram of an example routine or technique implemented by an image processing system to detect damage to an automobile caused by an accident.

FIG. 3 illustrates an example routine or method 300 that may be implemented by the systems of FIGS. 1 and 2 to detect damage to an automobile or other vehicle caused by, for example, an accident. Generally speaking, at a block 302, the routine 300 acquires one or more images of the damaged vehicle, referred to herein as target vehicle images. These images may include what is generally called the four-corner images (that is, images taken of the vehicle from each of the four corners), side view images, front and/or rear view images, top and/or bottom view images, inside view images (such as of the dash board, the trunk compartment, the passenger compartment, the engine compartment, etc.) of the automobile, an any other types of images. Of course, any number of images may be taken and collected of a particular damaged vehicle and any of these images can be provided to and used in the image processing routine 300 in determining damage caused to the vehicle.

At a block 304, the system or routine 300 may analyze each of the images in some preliminary manner to determine whether each image is usable or necessary for use in determining the damage to the vehicle. In many cases, different images may show the same or overlapping portions of the vehicle, with some of the images being of better quality or usefulness than other images. The block 304 may select a subset of the provided images, where the subset of images is deemed to be best to be used to determine the damage to the vehicle. In some cases, the block 304 may determine that not enough images have been taken, or that images of the right quality have not been obtained, or that a complete set of images or images from a necessary set of angles have not been obtained, etc., to enable the image processing routine 300 to determine a reliable damage estimate. In such cases, the block 304 may return control to the block 302, which may then instruct a user to take or otherwise obtain new images of the damaged automobile. The block 304 may provide instructions as to the type of images to take, such as the angle from which to take the images, one or more potential problems with the original images (e.g., too much glare, foreground objects are in the way, the images were taken from a point too close or too far away from the vehicle, etc.). Based on these comments, the block 302 may, for example, instruct the user to take or otherwise acquire particular types of images, such as four corner images, an image of the right or left side of the car, etc. In any event, the blocks 302 and 304 may iterate until an acceptable subset of images have been obtained, which will enable the imagine processing routine 300 to reliably predict the damage to the vehicle based on the image processing techniques described herein. Of course while the block 304 is illustrated as being immediately downstream of the block 302, the block 304 could be dispersed at any part throughout the flowchart of 300 of FIG. 3, in the manner illustrated in FIG. 2, to enable the system 300 to more accurately determine whether a set of target vehicle images has been obtained depicting the damaged vehicle that are usable in reliably detecting and/or quantifying damage to the vehicle.

Next, a block 306 operates to select or identify a base object model of the automobile or vehicle depicted in the obtained target object images. The block 306 may obtain an identification of the automobile depicted in the selected target object images (such as the make/model/year of the automobile or some other identification of the automobile type depicted in the obtained images) from, for example, image information files developed for the target vehicle images, the FNOL information submitted to an insurance carrier, the user directly, etc. The block 306 may use this identification information to select or find a base object model, as stored in one of the base object model files 120 of FIG. 1, that corresponds to the identified target vehicle. As noted above, the base object model for a vehicle or automobile generally represents the vehicle depicted in the target vehicle images (e.g., the target vehicle) in a condition prior to the occurrence of the damage, or in an as expected condition or state. In some cases, the block 306 may automatically process the target vehicle images to provide a best fit between the vehicle image depicted in the target vehicle images and a vehicle represented in the base object models 120, to thereby determine the specific type of vehicle depicted in the damaged vehicle images.

Figure 4:
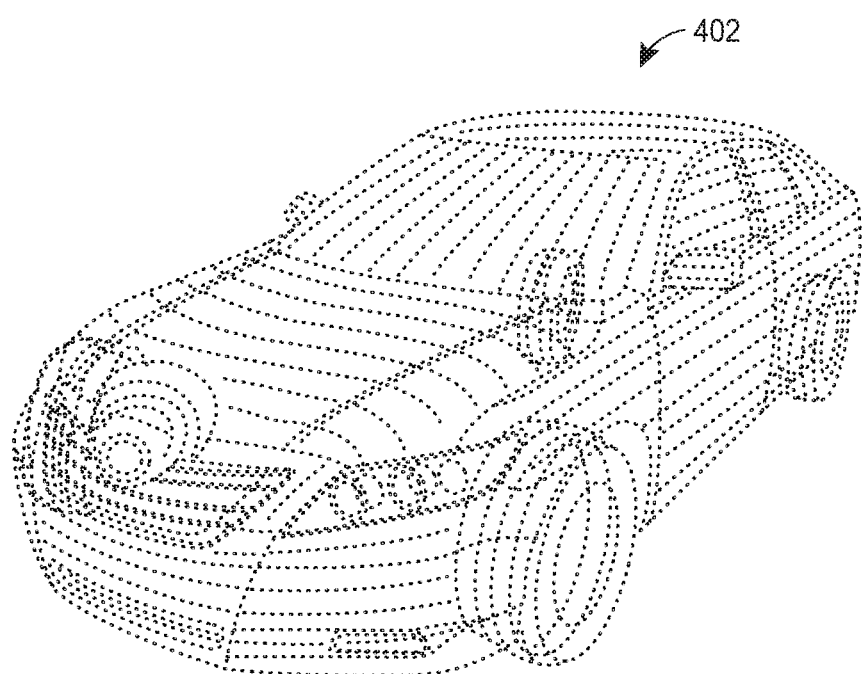
FIG. 4 depicts an example three dimensional point cloud object model used as a base object model of an automobile for use in detecting damage to automobiles of the same type.

As an example, FIG. 4 illustrates a point cloud object model 402 of a vehicle, which in this case is a Toyota Camry® of a particular year, that may be used as a base object model for damaged or target vehicle images depicting a damaged Toyota Camry of the same year. The point cloud object model 402 may be stored in, for example, the vehicle image database 108 of FIG. 1, and may be obtained from, for example, the automobile manufacturer, or from any other source. Generally speaking, the point cloud object model 402 is a three dimensional model that stores points in space that define or identify the contour of the body of a vehicle being depicted or associated with the object model. In some cases, the point cloud object model 402 may include points that define the outer contours of the various body panels of the automobile, but the point cloud model 402 could additionally or instead define other contours of the automobile, including inner contours (such as contours defining the engine compartment, the passenger compartment, the inside of the trunk, between various body parts or panels, etc.). If desired, the base object model, such as the point cloud model 402 of FIG. 4, may be rotated in various manners to correctly illustrate the object (e.g., the automobile) from different angles, positions, view-points, distances, etc. Moreover, while a point cloud object model 402 is illustrated in FIG. 4 as being used as a base object model, other types of object models could be used as well, including any types of mesh models such as three dimensional (3D) triangle mesh models (including triangulated 3D models, point cloud models, polygon mesh models, triangle mesh models), wireframe models, surface patch models, rendered surface models, etc.

Still further, while the base object model in the form of the point cloud model 402 is depicted and described as a three dimensional model, the base object model could be a two dimensional model (such as a flat image or model of the object in a non-damaged or expected condition) or could be made up of a set of two dimensional models (e.g., from a set of two or more images of the object from different points of view or angles, in a pre-damaged condition). Still further, the point cloud object model 402 may be manipulated, e.g., rotated and viewed from different angles, perspectives and distances, using any well-known three dimensional viewing routine or software, such as a computer aided drawing (CAD) program or the like.

Figure 5:
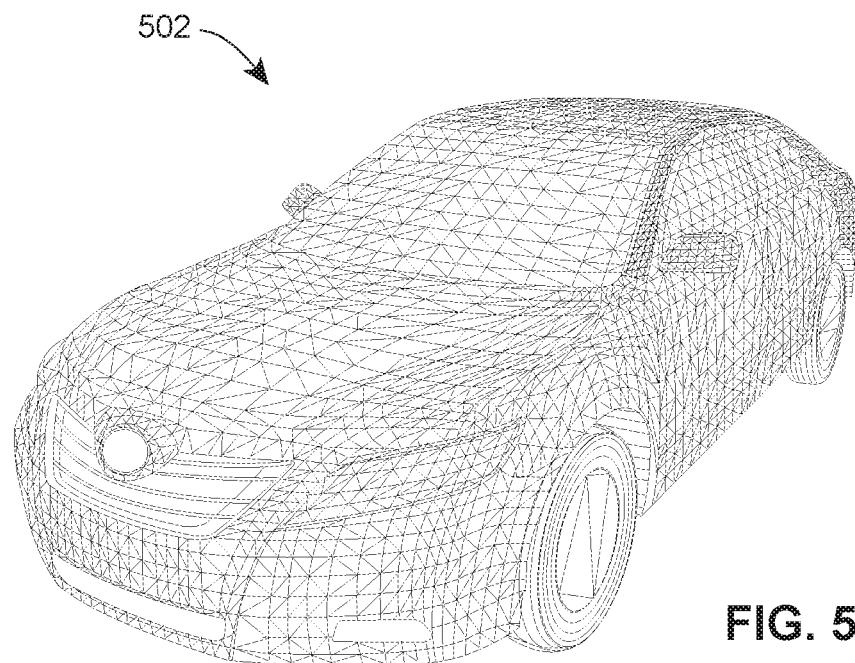
FIG. 5 depicts an example three dimensional object model of an automobile having surface contours or surface segments thereof defined.

As a still further example, FIG. 5 illustrates a base object model 502, which may be developed from, for example, the point cloud model 402 of FIG. 4, and which may also or instead be used as a base object model by the image processing system 300 for detecting damage to an automobile of the same type. In particular, the base object model 502 includes contour lines drawn between adjacent points in the point cloud model 402, forming triangles. Each triangle defines a particular surface segment of the automobile within the base object model 502 to thereby define the different flat surfaces (e.g., relatively flat or planar surfaces) of the base object. As will be understood, smaller triangles are associated with or are present at locations on the surface of the automobile with larger gradients of curvature, and larger triangles are associated with or are present at locations on the surface of the automobile with smaller gradients of curvature. That is, more curves or higher degrees of curvature in the surface of the automobile at a particular location tend to result in smaller area triangles being formed at or for that location within the base object model 502. Thus, the base object model 502 of FIG. 5 is a triangulated surface model that illustrates the three dimensional surface contours of the vehicle being modeled. Each of the triangular surface areas of the model 502 of FIG. 5 may be considered a surface segment of the base object model 502.

Figure 6:
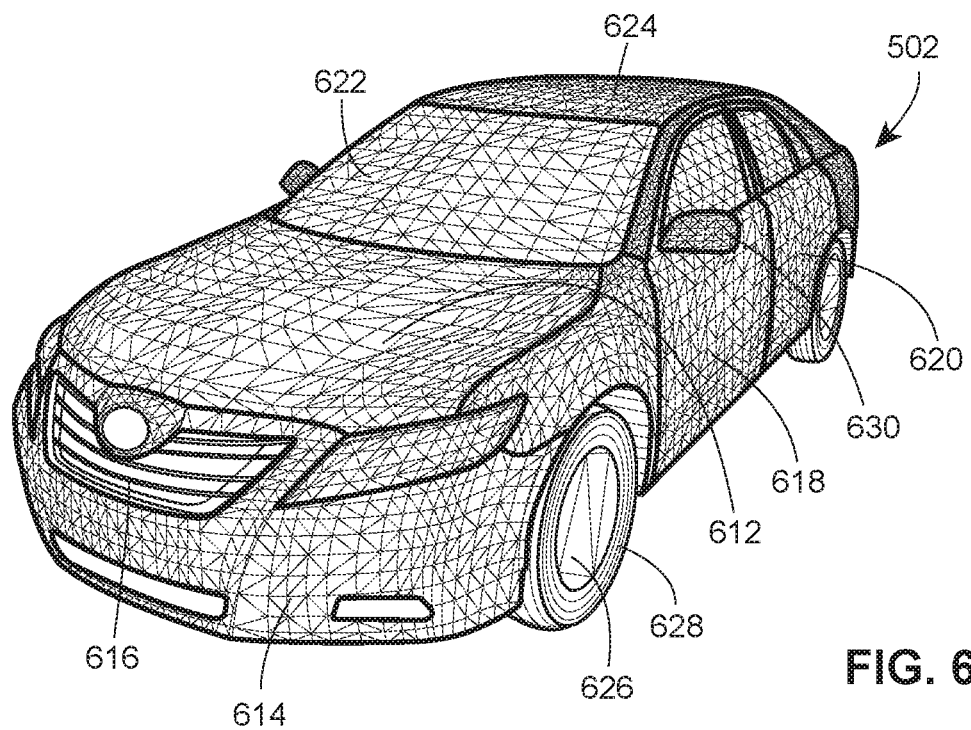
FIG. 6 depicts a body panel segmented base object model developed from the object model of FIG. 5 including indications of various body panels of the automobile.

Moreover, as illustrated in FIG. 6, the base object model 502 (illustrated in FIG. 6 with the triangular surface segments being slightly grayed) may include indications or outlines of various different body panels (indicated in FIG. 6 by thicker lines) associated with the automobile being modeled. For example, body segments or body panels of the automobile depicted by or modeled by the base object model 502 may include a hood segment 612, a front bumper segment 614, a grill segment 616, a driver's side front door segment 618, a driver's side rear door segment 620, a windshield segment 622, a roof segment 624, a front wheel segment 626, a tire segment 628, a driver's side rear view mirror segment 630, etc. Of course, each of these segments may define or correspond to a different body panel or body part that is, for example, viewable from the outside of the automobile and thus that is present in the base object model 502. The body segments may of course define other parts or components of the object being modeled, if so desired. In one case, each body segment may define a different body panel as defined by the manufacturer of the automobile, with each body panel being a unitary, single piece, and/or separable piece of the automobile that may be replaced or changed without changing the other body panels or segments.

Figure 7:
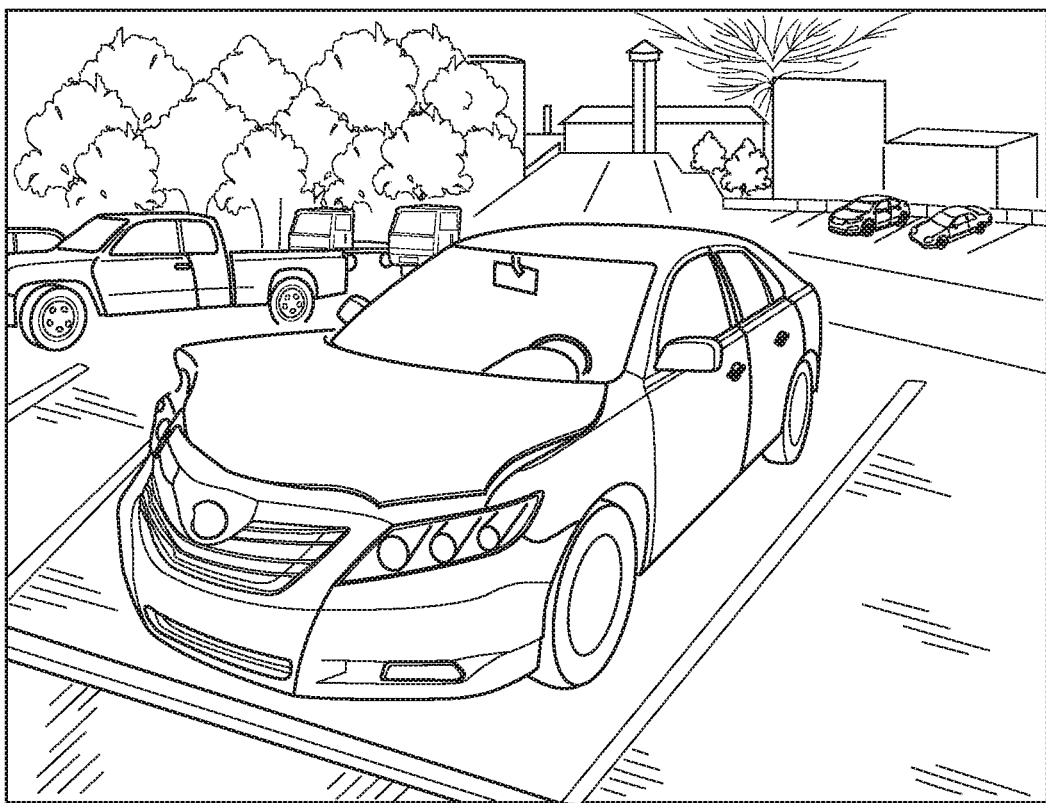
FIG. 7 depicts an image of a target or damaged vehicle to be processed by the image processing system of FIG. 1 to detect and/or quantify changes to the target vehicle as compared to a base object model of the vehicle.

FIG. 7 illustrates an image or photo of a target (e.g., damaged) vehicle corresponding to the base object model of FIGS. 4, 5, and 6. The photo image of FIG. 7 may be one of the target images obtained from a user of the system 300 which will be used, along with the base object model 502, to determine a characterization of or an identification of the damage to (change in) the target vehicle depicted in the image of FIG. 7 with respect to the base vehicle as defined by the base object model 502. As will be seen, the target vehicle or automobile depicted in the image of FIG. 7 has damage to the front end thereof which effects (has changed) at least the grill, the front hood, and the front bumper of the vehicle. Of course, there may be other damage to the target vehicle within FIG. 7 that is not visible in the image of FIG. 7, but that may be visible in other images of that vehicle (e.g., in rear views, passenger side or front corner views, etc.) which images may be provided and processed separately.

Figure 9:
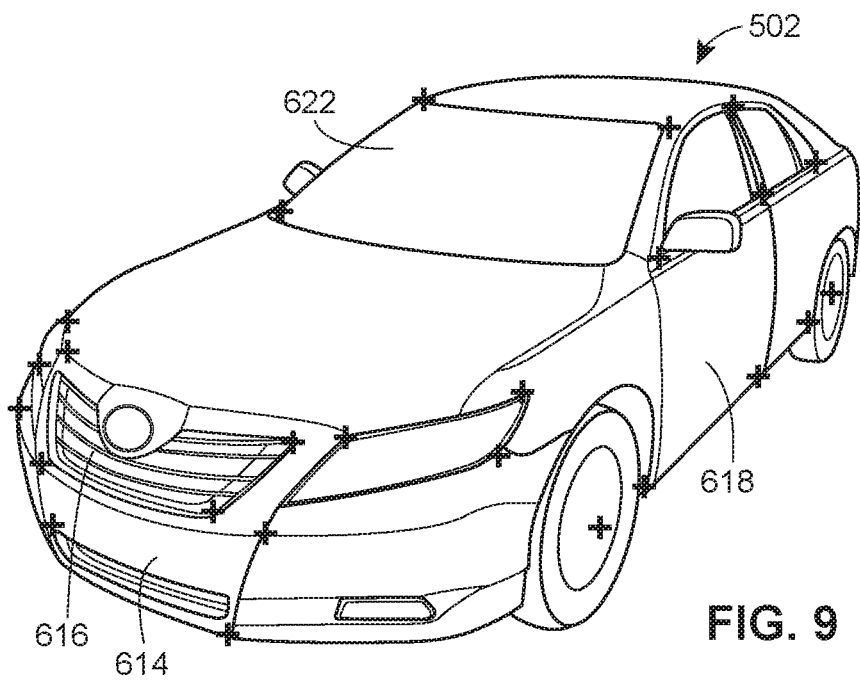
FIG. 9 depicts the segmented base object model of FIG. 6 having a set of predetermined landmarks designated therein.
Figure 8:
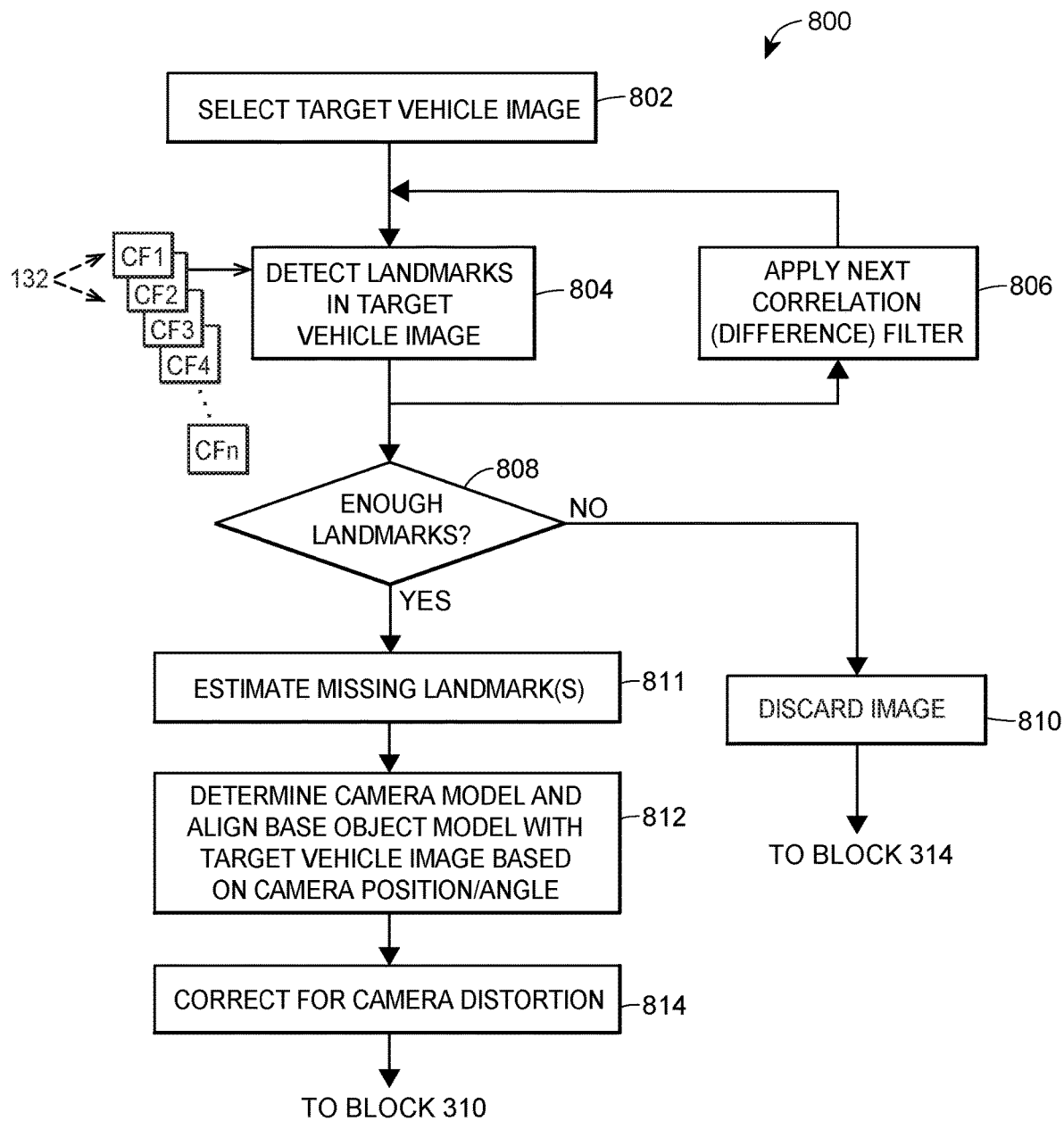
FIG. 8 depicts a flow chart of a portion of the image processing technique of FIGS. 2 and 3 that may be used to detect and align camera angle and point of view differences between a target vehicle image and a base object model for the target vehicle, and to correct for camera distortion effects in the target vehicle image.

Referring back to FIG. 3, a block 308 may operate to align the base object model 502 (or to align one more images obtained from the base object model 502) with each of the selected images, such as the target vehicle image of FIG. 7. Still further, the block 308 may correct for distortion in the target vehicle images (or a target vehicle model developed from those images), such as to correct for camera point of view distortions, camera lens and focal length distortions, etc. Generally speaking, FIG. 8 illustrates a flowchart 800, which may be used in, for example, the block 308 of FIG. 3 to perform target image/base object model alignment and correction of the target vehicle images. In particular, as illustrated in FIG. 8, the flowchart 800 includes a block 802, which accesses the target vehicle images and which may analyze each of the target vehicle images separately to correct and align each target image with the base object model (or vice-versa). In particular, the block 802 may select a particular target vehicle image and provide control to a block 804 which processes the target vehicle image to detect one or more landmarks within the image. Generally speaking, landmarks are particular points on the object defined in the base object model. As an example, FIG. 9 illustrates a base object model associated with the vehicle for which damage is to be detected, but having various landmarks defined therein. In this case, each landmark is designated with a plus sign (+). Generally speaking, any number of landmarks may be selected or predefined for each base object within a base object model, and these landmarks may be stored as part of or as associated with the base object model. In some cases, landmarks may be best located at the intersection of various different sections, parts, or components of the base object model to make such landmarks more easily detectable, although this suggestion need not be the case in all situations. In the example of FIG. 9, landmarks may be defined in the base object model 502 to include positions at which the grill 616 of the vehicle intersects with the bumper 614, at which the headlights intersect with the side panels of the vehicle, at the four corners of the windshield 622, at the intersection of the driver's side front door panel with the front body panel, etc. Of course, any number of landmarks may be defined for and stored within or as part of the base object model 502. Generally speaking, the routine 800 will determine the landmarks that are detectable within a selected target vehicle image, and will use those detected landmarks to then align the object depicted in the base object model with the object as depicted within the selected target vehicle image. In other cases, the routine 800 may detect landmarks in multiple ones of the target vehicle image in the process of creating a composite target vehicle model from those images.

To perform landmark detection, the block 804 may apply various ones of the correlation filters 132 to the target vehicle image (e.g., the image of FIG. 7) to detect the landmarks within the target vehicle image which are defined in the base object model 502. Basically, a single or different correlation filter 132 may be created for each of the landmarks within the base object model 502. In one example, the correlation filters 132 may be, for example, two dimensional image filters (e.g., a 10 by 10 pixel filter, a 100 by 200 pixel filter, etc.) that measures the correlation of or matching of the surrounding pixels of a particular point in the target vehicle image to the surrounding pixels of the base object image at which the landmark is defined. A high degree of pixel matching (from a least squared error perspective, for example) results in a high correlation value for a particular pixel being analyzed (such as the center pixel of the correlation filter) resulting in a high likelihood that the particular pixel in the target vehicle image matches up with the landmark as defined in the base object model 502.

In another example, the block 804 may use correlation filters that are applied to or that use any of various types of feature descriptors or feature vectors, such as a histogram of oriented gradients (HOG) feature vectors, a SIFT (scale-invariant feature transform) descriptor, a SURF (speeded up robust features) descriptor, a GLOH (gradient location and orientation histogram) descriptor, etc. As an example, the HOG feature descriptor is a feature descriptor based technique typically used in computer vision and image processing for the purpose of detecting persons or objects in images. Generally, this technique counts occurrences of gradient orientation in localized portions of an image and is thus similar to that of edge orientation histograms, scale-invariant feature transform descriptors, and shape contexts, but differs in that it is computed on a dense grid of uniformly spaced cells and uses overlapping local contrast normalization for improved accuracy. While typically used for pedestrian detection in static images, it has also been used for human detection in videos, to detect a variety of common animals and vehicles in static imagery, etc.

The basic principle behind the HOG feature descriptor is that local object appearance and shape within an image can be described by the distribution of intensity gradients or edge directions. The image is divided into small connected regions called cells, and the descriptor technique compiles a histogram of gradient directions for the pixels within each cell. The descriptor is the concatenation of these histograms. For improved accuracy, the local histograms can be contrast-normalized by calculating a measure of the intensity across a larger region of the image, called a block, and then using this value to normalize all cells within the block. This normalization results in better invariance to changes in illumination and shadowing. The HOG feature descriptor has a number of key advantages over other types of feature descriptors. Firstly, because the HOG descriptor operates on local cells, this technique is invariant to geometric and photometric transformations, except for object orientation. Such changes would only appear in larger spatial regions. Secondly, coarse spatial sampling, fine orientation sampling, and strong local photometric normalization permits the individual body movement of objects to be ignored so long as these objects maintain a roughly upright position.

The first step of feature vector calculation in many feature detector techniques is to ensure normalized color and gamma values. However, this step can be omitted in the HOG descriptor computation, as the ensuing descriptor normalization essentially achieves the same result. Instead, the first step of the HOG calculation is to compute the gradient values. The most common method is to apply the one dimensional centered, point discrete derivative mask in one or both of the horizontal and vertical directions. This method may require filtering the color or intensity data of the image with filter kernels such as:

[−1, 0, 1] and [−1, 0, 1]$^T$.

The second step of the calculation is to create the cell histograms. Each pixel within the cell casts a weighted vote for an orientation-based histogram channel based on the values found in the gradient computation. The cells themselves can be, for example, rectangular or radial in shape, and the histogram channels may be evenly spread over 0 to 180 degrees or 0 to 360 degrees, depending on whether the gradient is "unsigned" or "signed". As for the vote weight, a pixel contribution can either be the gradient magnitude itself, or some function of the magnitude. Other options for the vote weight could include the square root or square of the gradient magnitude, or some clipped version of the magnitude.

To account for changes in illumination and contrast, the gradient strengths can be locally normalized, which requires grouping the cells together into larger, spatially connected blocks. The HOG descriptor is then comprised of the concatenated vector of the components of the normalized cell histograms from all of the block regions. These blocks typically overlap, meaning that each cell or at least some cells contribute more than once to the final descriptor. Two main block geometries exist, including rectangular R-HOG blocks and circular C-HOG blocks. R-HOG blocks are generally square grids, represented by three parameters, i.e., the number of cells per block, the number of pixels per cell, and the number of channels per cell histogram. In some cases, four 8×8 pixel cells per block (16×16 pixels per block) with nine histogram channels is deemed to be useful. Moreover, minor improvement in performance may be gained by applying a Gaussian spatial window within each block before tabulating histogram votes so as to weight pixels around the edge of the blocks less. The R-HOG blocks appear quite similar to the scale-invariant feature transform (SIFT) descriptors. However, despite their similar formation, R-HOG blocks are computed in dense grids at some single scale without orientation alignment, whereas SIFT descriptors are usually computed at sparse, scale-invariant key image points and are rotated to align orientation. In addition, the R-HOG blocks are used in conjunction to encode spatial form information, while SIFT descriptors are used singly. On the other hand, circular HOG blocks (C-HOG) can be found in two variants, i.e., those with a single, central cell, and those with an angularly divided central cell. In addition, C-HOG blocks can be described with four parameters, i.e., the number of angular and radial bins, the radius of the center bin, and the expansion factor for the radius of additional radial bins.

In any event, the final step in object recognition using HOG descriptors is to feed the descriptors into some recognition system based on supervised learning. As an example, the support vector machine (SVM) classifier is a binary classifier which looks for an optimal hyper-plane as a decision function. Once trained on images containing some particular object (such as the training images of FIG. 1), the SVM classifier can make decisions regarding the presence of an object, or landmark, in additional images. The features of the gradient descriptors may also be fed into neural network classifiers which may provide more accuracy in the classification as compared to other classifiers. The neural classifiers can accept the descriptor feature as the binary function or the optimal function.

Thus, the block 804 of FIG. 8 may, for example, apply or scan each of the correlation filters 132 across a set of pixels of the target vehicle image being analyzed (which may be all of the pixels of the target vehicle image) to determine to a correlation value for each such pixel or pixel area. The block 804 may select the pixel or area that has the highest correlation value or classifier value for a particular correlation filter as the most likely position of the landmark associated with the correlation filter and may determine that the pixel is to be detected as the landmark if the correlation value of that pixel is over or above a certain amount (e.g., close to one, such as greater than 0.8 or 0.9 or 0.95 or 0.98, etc.). The block, 804 may then store the landmark detection results in a memory (e.g., may store an indication if a landmark was detected and the position of the landmark in the target vehicle image for detected landmarks). The block 804 may apply each of the correlation filters 132 to each of the selected set of pixels in the target vehicle image to look for each landmark identified in the base object model 502. It is possible, in many cases, that the block 804 may not be able to find some or all of the landmarks due to the fact that, for example, some of the landmarks may be located in regions of the vehicle that are damaged in a manner that masks or prevents the detection of the landmark using the correct correlation filter 132. It may also be possible that some of the landmarks are not visible in the image being analyzed, resulting in a low correlation value from the correlation filter for that landmark at all pixel locations. Still further, in some cases, the block 804 might have access to some information about the target vehicle image being processed that may limit the number of landmarks searched and thus the number of correlation filters 132 applied to that particular target vehicle image. For example, if the perspective or view of the target object depicted in the target image is identified in some manner, for example, it is known that the target vehicle image being analyzed depicts the right front corner of the target vehicle, then the block 804 may not search landmarks associated with positions on the target vehicle that are not normally visible from that perspective (i.e., the right front corner of the vehicle) when analyzing this particular target vehicle image.

Of course, when the block 804 is finished analyzing a selected target vehicle image with a particular correlation filter (CF) 132, a block 806 may select the next correlation filter 132 and the block 804 may then analyze the target vehicle image for the next landmark associated with the newly selected correlation filter 132, and store the results of the landmark detection in memory (e.g., if a landmark was detected and, if so, the location of the landmark in the damaged vehicle image).

As will be understood, a correlation filter 132 may generally be created for each of the identified landmarks during the training stage of the image processing system (e.g., by the image processing training routines 130), in a manner that enables the landmark to be identified by examining the various pixel values near, at or surrounding the landmark. However, the correlation filters 132 may also be created during run-time of the image processing routine 140 from the base object model or from an image of the base object model. Generally speaking, during landmark detection on a damaged or target vehicle image, the correlation filter (which may define a two dimensional pixel area) is applied at various points or pixels throughout the selected target vehicle image, moving the center of the correlation filter on a pixel-by-pixel basis for example, to determine the correlation or registration between the correlation filter pixels and the pixels of the damaged vehicle image to thereby determine the likelihood that the correlation filter is centered at a landmark associated with the correlation filter. This comparison process may be repeated for each pixel or for various sets of pixels, such as every five pixels of the image, etc., for each correlation filter 132, computing for each position at which the correlation filter is applied to the target vehicle image the likelihood that the correlation filter 132 is centered over the landmark associated with the correlation filter. In some cases, different correlation filters may be generated for the same landmark, and these correlation filters may be different in size, for example, to provide for better correlation analysis. In this case, the block 804 may run a first pass through the target vehicle image using a smaller correlation filter (e.g., a 10 by 10 pixel filter) for a particular landmark, looking for candidate matches, and may run a second pass over the locations in the image that had a high correlation in the first pass using a larger correlation filter (e.g., a 100 by 100 pixel filter) for the same landmark. Any number of such passes or iterations may be made to provide for better correlation analysis in a shorter amount of time or with less processing power.

The output of the correlation analysis at each pixel or location may be a value between, for example, zero and one, indicating the likelihood of correlation between the pixels of the correlation filter and the pixels of the damaged vehicle image currently covered by the correlation filter, with a number near one meaning that there is a high likelihood of match, and with a number close to zero meaning that this is a low likelihood of match. Of course, the block 804 may scan through the entire target vehicle image with a particular correlation filter, and may review the results of each correlation analysis of a particular correlation filter to determine whether there is a likelihood that the target vehicle image pixel being analyzed is the landmark associated with the correlation filter. While this description indicates that the block 804 uses one or more correlation filters to perform landmark detection, the block 804 could use other types of filters instead, such as other types of difference filters. Still further, the creation and use of correlation filters is known in the art and is described in more detail in, for example, Boddeti, Vishnu, Takeo Kanade, and B. V. K. Kumar, "Correlation Filters for Object Alignment," Proceedings of the IEEE Conference on Computer Vision and Pattern Recognition (2013), the contents of which is hereby expressly incorporate by reference herein.

After analyzing a particular target vehicle image for each of the landmarks using the various different correlation filters 132, a block 808 may determine if enough landmarks have been detected within the target vehicle image to perform further change processing thereon. Generally speaking, it is desirable to pick or analyze target vehicle images with multiple landmarks within them, as well as to pick a set of target vehicle images of the target vehicle that includes many or most of the landmarks available for or that have been pre-identified for the vehicle. For example, if no or only a small set of landmarks (e.g., one or two) are found in the target vehicle image, then a block 810 may discard that image for use in change processing as the analysis performed on the image may be of limited or no usefulness. At this point, further processing on that image that would usually be performed by the rest of the routine 800 is skipped, and control is provided back to a block 314 of FIG. 3 (which picks a new target vehicle image to analyze). Moreover, if not enough target vehicle images with a sufficient set of landmarks viewable therein are available, the block 810 may also instruct a user to obtain more target vehicle images. The block 810 could perform this function if, for example, a significant number landmarks are not available for one particular view, or if there are areas of the automobile that have no landmark coverage or very little landmark coverage, or if there is simply not enough landmarks and images to be able to perform further processing.

However, if enough (e.g., three or more) landmarks are detected in the damaged vehicle image, than a block 811 may use the detected landmarks to estimate or determine the position of the missing landmarks in that view. In one case, the block 811 may determine, from the detected landmarks, the expected position of the missing landmarks based on the relative three-dimensional positioning of these same landmarks in the base object model. In one case, the block 811 may use three dimensional interpolation techniques to determine the position of one or more of the missing landmarks in the target vehicle image based on the position of known or detected landmarks in the target vehicle image and the position of missing landmarks as defined in the base object model. In another case, a partial Bayesian inference technique may be used to determine or estimate missing landmarks based on detected landmarks and the shapes of the vehicle or components as defined by these landmarks. Such a partial Bayesian inference technique is described in Li, Yan, Li Gu, and Takeo Kanade, "A Robust Shape Model for Multi-View Car Alignment," Computer Vision and Pattern Recognition CVPR 2009, IEEE Conference on IEEE (2009), the contents of which are expressly incorporated by reference herein. Thereafter, a block 812 uses the detected landmarks (and potentially the estimated landmarks) to align the base object image with the damaged vehicle image.

Figure 10:
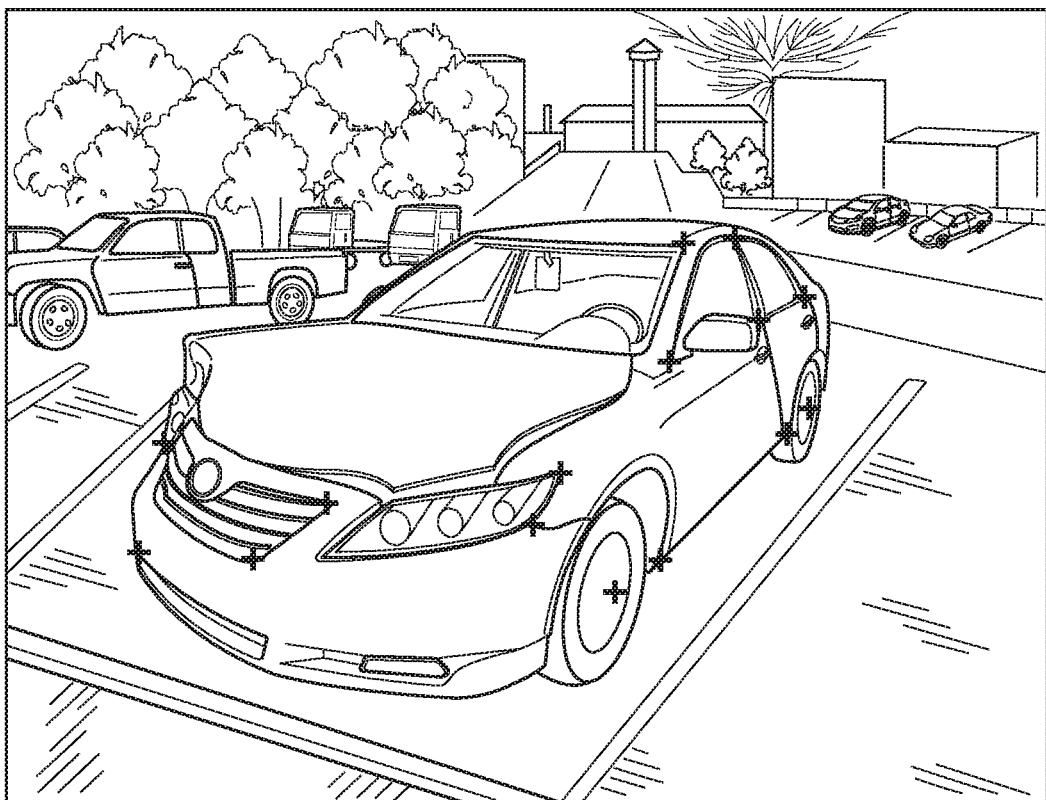
FIG. 10 depicts the image of the damaged automobile of FIG. 7 having detected landmarks illustrated therein.

For example, FIG. 10 depicts the damaged vehicle image of FIG. 7 with a set of the possible landmarks being detected. In particular, 13 landmarks have been detected in the image of FIG. 10. As will be seen in FIG. 10, not all of the landmarks on the front of the vehicle (as depicted in the base object model of FIG. 9) were detected due to the damage to various locations of the vehicle, but landmarks at relatively undamaged locations were detected. Thereafter, the block 811 may estimate the position of the missing landmarks by interpolating or inferring the position of these landmarks based on the positioning of the detected landmarks, as noted above.

Next, using the detected (and potentially the estimated) landmarks as determined by the blocks 808 and 811, the block 812 can determine the angle and distance at which the camera that took the picture of the target vehicle as depicted in FIG. 7 was located using standard image processing techniques. Still further, the block 812 can correct for internal and external camera distortions. With the corrected landmark information, the block 812 rotates and scales the base object model to match the perspective of the target object as depicted in the target vehicle image. That is, the block 812 can rotate the base object model to the same angle (in three dimensions for example), and can scale (move towards or away from the object) to match the position of the camera that took the damaged vehicle image. Generally speaking, the block 812 may determine, from the detected and estimated landmarks in the target vehicle image being analyzed, the camera model for the image. The camera model may include the camera positioning with respect to the target object and camera distortion. One manner of determining and calibrating for camera effects in the target vehicle images is described in more detail in Heikkila, Janne, Olli Silvén, "A Four-Step Camera Calibration Procedure with Implicit Image Correction," Computer Vision and Pattern Recognition, 1997; Proceedings, 1997 IEEE Computer Society Conference on. IEEE (1997), the contents of which are hereby expressly incorporated by reference herein.

As noted above, the base object model may be based on or incorporate a three dimensional model that may viewed or manipulated in the three dimensional viewing program to be rotated or viewed from any angle, position, and/or distance. Thus, to properly align the base object model with the target vehicle image, as taken by or depicted in a two dimensional photograph, the perspective view of the object in the three dimensional model should be aligned and positioned to be the same as the target object as viewed in the target object image, i.e., so that the base object model is viewed from the position and camera angle as the camera that took the target vehicle image being processed. The block 812 can perform a comparison of the positions of the pre-identified landmarks in the base object model with the detected (and estimated) landmarks within the target vehicle image being processed to determine the camera position, view, and orientation of the base image object that best matches the positioning of the landmarks as detected in the target vehicle image being processed. The block 812 can then rotate and scale the base object image to that camera position, view, and orientation, thereby aligning the base object model with the target object as depicted in the target vehicle image. In this manner, the block 812 can rotate and scale the three dimensional base object model to produce an image that is of the same scale and that is taken from the same location or position as the target vehicle image being processed. Of course, if the target object images are used to create a composite target object model, this target object model can be rotated to the same position as the base object model.

Thereafter, the block 812 can create or capture a two dimensional image of the base object from the base object model from the determined camera position, so that the image of the object created from the base object model is aligned with and scaled to be the same size as the target object as depicted in the target vehicle image. Of course, if desired, the block 812 could instead process the target vehicle image to rotate and scale that image to match a particular view or alignment of the base object model to thereby align the base object model, or an image from the base object model, with the target object within the target object image. Thus, for example, the block 812 could process (rotate and scale, for example) target object images so as to align the target object in these images with the base object model at a particular orientation, such that the change detection and the following prediction analyses may be based on a common reference frame (such as a 3D model, un-wrapped 2D cardboard representation, etc.) Thus, for example, it may be desirable to rotate and/or scale the target object within the target object image to a particular point of view or scale so as to match the point of view or scale of the object to that of the images that were used to develop the CNNs 134 (or other change/damage detectors) for that object during the training stage.

Still further, a block 814 may, based on a comparison between the positions of the landmarks in the aligned image of the base object model and the detected landmarks in the target vehicle image, correct for camera distortions that were introduced by the camera that actually took the damaged vehicle image. More particularly, the block 814 may, based on a comparison of the detected and estimated landmarks in the target vehicle image and the landmarks in the aligned image from the base object model, determine one or more distortion transfer functions that define the various types of distortion introduced by the camera that took the damaged vehicle image. In general, the landmarks in the aligned base object image and the landmarks in the target object image may not match each other exactly because the alignment calculations may determine the best or most likely camera angle and position in a statistical manner (e.g., by determining the camera angle and camera position of the base object that produces an image having the smallest or least squared error between the various pairs of landmarks in the base object image and the target object image). These differences may be the result of internal camera distortion effects, such as lens distortion effects. The block 814 may determine or calculate the camera distortion function based on these differences and may then correct the target object image to correct for or to remove the internal camera distortions. As such, the block 814 uses these distortion functions to correct for the distortion introduced into the target vehicle image by the camera. For example, the block 814 may determine an inverse of the internal camera distortion function and apply this inverse across the image pixels of the target vehicle image being processed to correct for this distortion. On the other hand, the block 814 could apply the distortion function to the aligned image from the base object model to distort that image in the same manner as the target vehicle image was distorted.

When the block 814 has corrected the target vehicle image for distortion, the system now has a base object image (produced from the base object model) that is aligned with a distortion corrected image of the target vehicle as depicted in the target vehicle image, so that the objects within the images are depicted from the same view angle, and are of the same scale and size.

Figure 11:
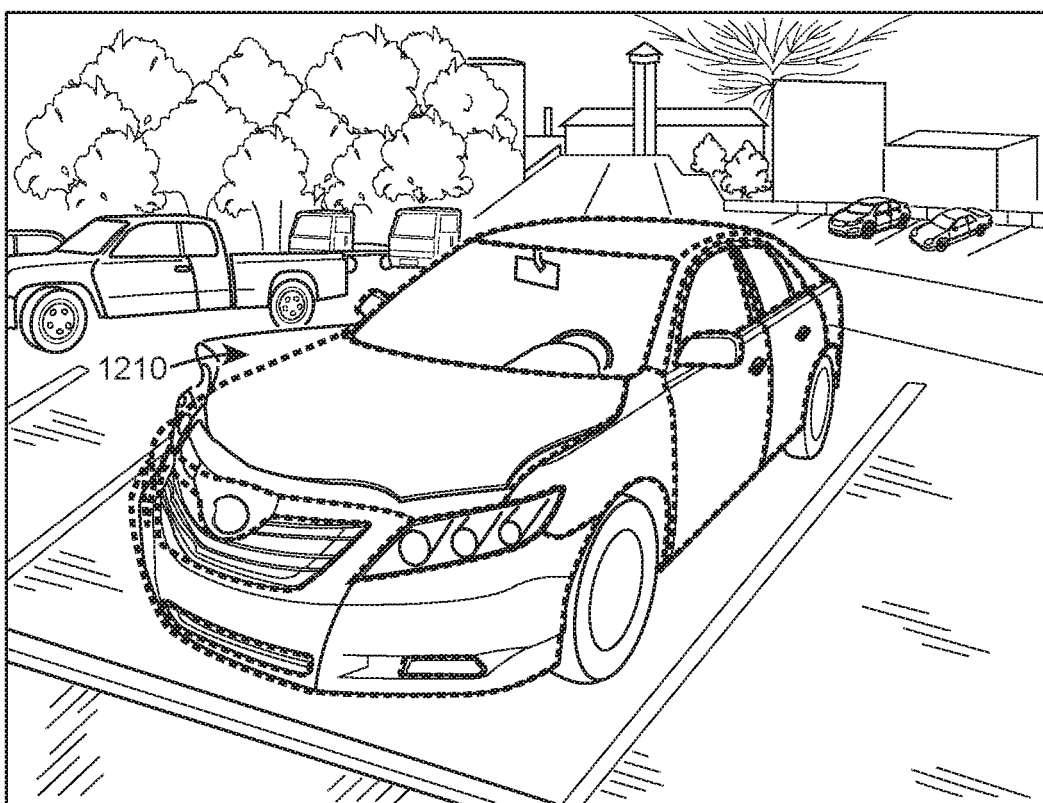
FIG. 11 depicts a distortion corrected and aligned image of the damaged automobile of FIG. 7 being analyzed based on the detection of landmarks overlaid on an image from the base object model (shown in outline only) to define body segments or components of the damage vehicle.
Figure 12:
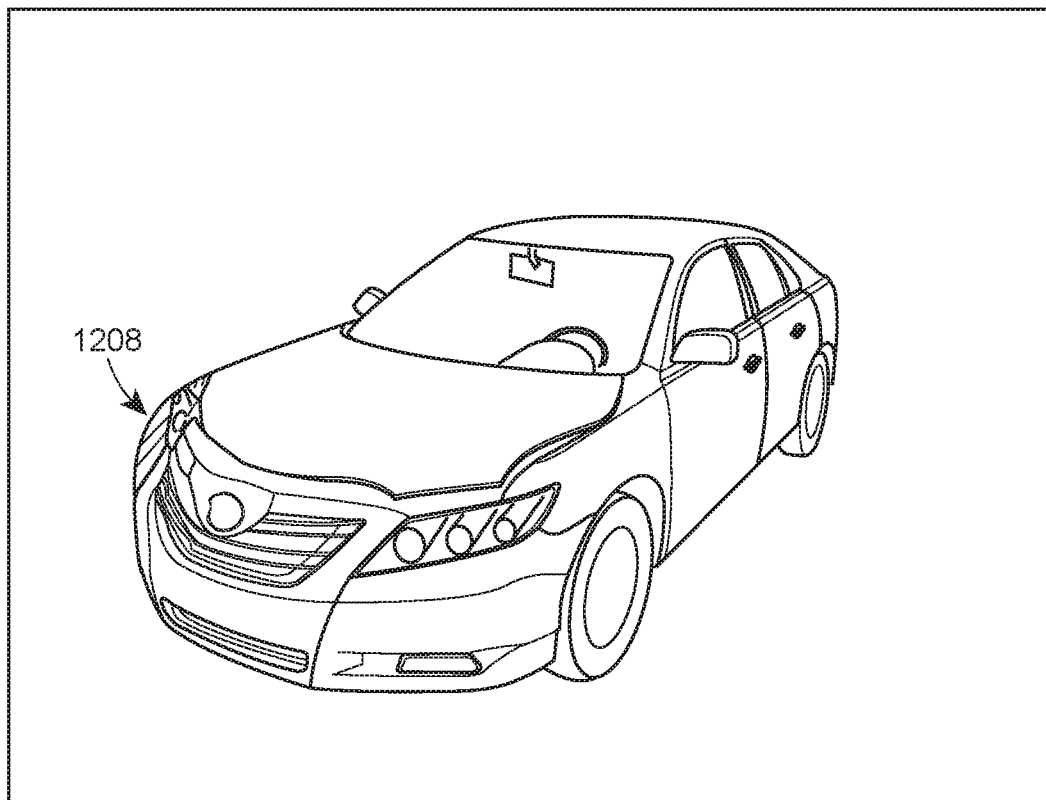
FIG. 12 depicts the corrected image of the damaged automobile of FIG. 7 being analyzed with background effects detected and deleted.

Referring back now to FIG. 3, a block 310 operates on the corrected target vehicle image and the aligned object image from the base object model to eliminate background effects and/or other non-vehicle related content from the target vehicle image. In particular, the block 310 may overlay the corrected target vehicle image with the aligned object image from the base object model to define the outer contours of the vehicle (target object) within the target vehicle image. FIG. 11 illustrates such an overlay between a segmented aligned version of the object image generated from the base object model and the distortion corrected target vehicle image, in which the segmented object image from the base object model is illustrated in dotted line. Thereafter, all pixels in the damaged vehicle image that fall outside of one of the segments or components of the aligned base object model image are identified as background image pixels and can be set to a neutral pixel value, such as zero or dark. This action prevents these pixels from being considered to be part of the target image in future calculations. FIG. 12 illustrates the corrected target vehicle image of FIG. 7 with background image pixels removed for further processing of the target vehicle image. As can be seen in FIG. 12, some of the background image pixels (designated generally at 1208) remain in the image of FIG. 12 as these pixels fall within the outline of the aligned base object image when overlaid with the target vehicle image as depicted in FIG. 11. Moreover, there are areas of the hood body panel of the target vehicle of FIG. 12 actually fall outside of the outer contour of the hood body panel of the base object image which were thus designated as background pixels in FIG. 12. This area is depicted with the reference numeral 1210 in FIG. 11. In any event, FIG. 12 illustrates the manner in which the body panels or segments of the target vehicle, as defined in the base object model, overlay with the target vehicle as depicted in the corrected target vehicle image to define the contours of each of the body panels or segments of the target vehicle depicted in the target vehicle image. The block 310 may thus create a background eliminated, segmented, corrected damaged vehicle image that depicts the target vehicle with the contours of the body panels or other segments of the target vehicle defined and with the background image pixels removed.

Next, a block 312 determines or detects damage to the target vehicle as depicted in the background eliminated, segmented, corrected target vehicle image (also referred to herein as the segmented target vehicle image) for each of the individual body components on a body panel by body panel basis. In particular, the block 312 may apply one or more convolutional neural networks 134 to the pixels of each body panel of the segmented target vehicle image to determine potential damage, or likelihood of damage to these body panels, as defined by the trained convolutional neural networks (CNNs) 134.

Figure 13:
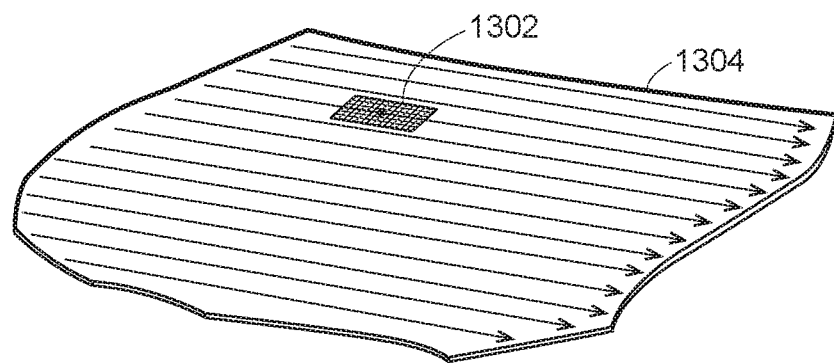
FIG. 13 depicts an example application of a convolutional neural network to a body panel of an automobile using a scanning technique, to detect damage at each pixel or area segment of the body panel.

As will be understood, the block 312 may use one or more CNNs 134 for each body panel or segment. As noted above, the CNNs 134 are statistically based processing tools created using the training set of vehicle image files 122 and training information files 124 of FIG. 1 to determine, based on known and quantified damage (or change) to the various body components of the same type of vehicle, the likelihood of damage to a vehicle depicted in an image not used in the training set of data. Thus, each CNN 134 can be used to identify damage (e.g., the likelihood of damage and/or a quantification of damage such as amount of damage or a type of damage) at each part (e.g., pixel, flat surface area such as the triangular surface segments of FIG. 5, etc.) of the body panel or segment being analyzed. In general, each convolutional neural network 134 defines a two dimensional area that overlays the pixels of the target vehicle image surrounding a pixel of the target vehicle image being analyzed for damage or change (e.g., the target vehicle image pixel that registers with the center pixel of the CNN), with each of the surrounding pixels and the pixel being analyzed being inputs to the CNN. FIG. 13, for example, illustrates a rectangular CNN 1302 applied to a pixel associated with the hood body panel 1304 of the segmented target vehicle image of FIG. 12. Each of the elements (pixels or inputs) of the CNN 1302 cover or overlay one of the pixels of the hood body panel 1304 with the CNN 1302 calculating or determining a damage parameter value for the pixel (shown in black or as a dark element) at the center of the CNN 1302. The CNN 1302 applies a series of weights and calculations (such weights being determined during the training of the CNN) to the inputs of the CNN 1302 to produce a damage parameter value or damage determination for the target vehicle image pixel being analyzed. The damage parameter value may represent a likelihood of damage, an amount of damage, and/or an indication of the type of damage, for example. The block 312 may scan the CNN 1302 over each pixel or other area (e.g., a 2 by 2 set of pixels, a 4 by 4 set of pixels, a particular segmented or flat surface area as defined by the base object model, etc.) in turn to determine a damage parameter value for each such entity (pixel, surface area, surface segment, etc.). For example, as illustrated in FIG. 13 by the arrows, the block 312 may scan the CNN 1302 over the target vehicle image covering each pixel or other area to which the CNN 1302 is applied, in a raster manner, to produce a damage parameter value at each such location or pixel of the body panel. The damage parameter values may take a range of values, such as a value on a scale of 0 to 100 or 0 to 10, etc.

As will be understood, each CNN will have been trained based on training images and data to define or detect damage to a particular body component based on pervious examples of quantified damage to the same body component as depicted within the training images in which the damage was known and quantified. Moreover, it will be understood that more than one CNN may be applied to each body panel or segment, and that these different CNNs may be trained to detect different types of damage, for example. In some cases, for example, one CNN may be trained to detect scratches, another CNN may be trained to detect dents, another CNN may be trained to detect folds, etc. Of course, a CNN may be trained to detect any type of damage (or other change) as long as the type of damage or change is quantified as such in the training set of data or images.

The block 312 may thus apply any number of CNNs to a body panel visible in the target vehicle image to produce one or more damage parameter values for each pixel or other surface element of a body panel. Likewise, the block 312 may run one or more CNNs over each separate body panel visible in the segmented target vehicle image being processed to thereby analyze each or a number of different body panels of the target vehicle in each image.

Of course, as illustrated in FIG. 3, a block 314 may select a new or the next target vehicle image to be processed and the routine 300 may repeat the steps 308 to 312 for each such target vehicle image until all of the target vehicle images are analyzed. Moreover, the block 314 may, upon processing any particular target vehicle image or after all of the target vehicle images are processed, determine if enough useful images of the target vehicle or if images covering all of the body panels of the target vehicle which need to be analyzed have been obtained, and if not, may instruct a user to obtain more or new images of the damaged vehicle. This operation may include indicating the body panels that need to be viewable in the new images (because, for example, change processing could not be performed on that body panel using the current set of target vehicle images, because the analysis on these body panels was indeterminate or inconsistent based on the current set of target vehicle images, etc.).

While this description particularly indicates that the block 312 uses CNNs 134 to detect damage to the target vehicle, it should be noted that the block 312 could use other types of statistical processing techniques to detect or classify damage or changes to particular target object components. For example, the block 312 may use type of deep learning network technique or machine learning technique, which includes the use of CNNs or ConvNet, artificial neural networks (ANNs), support vector machine (SVM) techniques, random forests techniques, multiple/multivariable linear regression techniques, general/multivariate linear regression techniques, generalized linear model (GLM) regression techniques, deep belief net (DBN) techniques, stacked auto-encoder techniques, convolutional deep belief network techniques, feed-forward ANN techniques, multi-layer perceptron (MLP) techniques, to name but a few. Moreover, the CNNs 134 or other deep learning tools may provide other possible outputs including, for example, a probability of a patch having damage (e.g., a number between 0 and 1), an indication of one or more types of damage detected (e.g., creases, dents, missing parts, cracks, scuffs, scrapes, scratches, etc.), an indication of damage severity (e.g., different damage levels based on, for example, the amount of labor hours required to repair or replace the component), an indication of a probability of hidden damage (e.g., damage not visible in the target images), an indication of the age of damage (e.g., whether the damage is prior damage or not), an indication of a repair cost for each involved body panel, an indication of a final repair cost, a confidence level with respect to prediction accuracy, etc. Still further, the CNNs or other deep learning technique may use, as inputs, a full set of target vehicle photos (not local patches), telematics data, video data, geographic variation data, etc.

Figure 14:
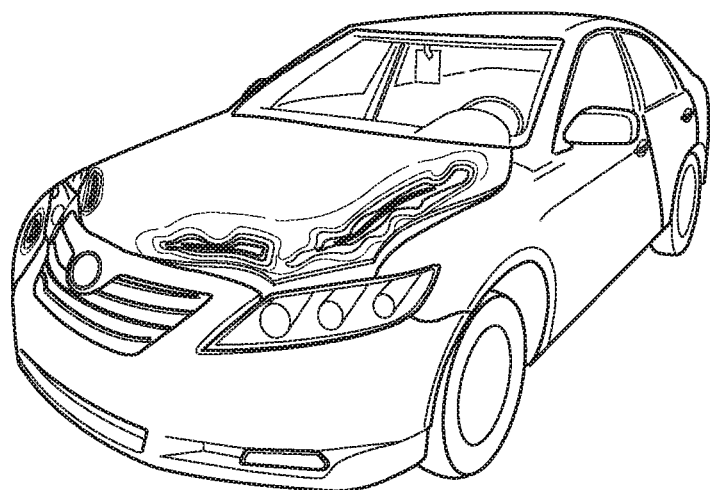
FIG. 14 depicts a heat map illustrating the detected changes to or the damage of the automobile being analyzed based on the convolutional neural network analyses of FIG. 13 applied to one image of the damaged automobile.
Figure 15:
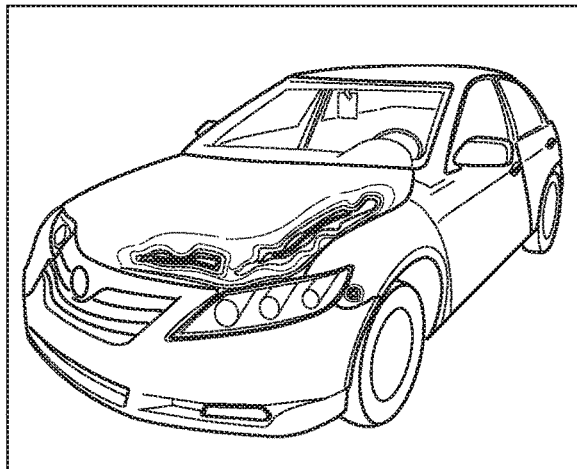
FIG. 15 depicts an example heat map illustrating the detected changes to or the damage of the automobile being analyzed based on the convolutional neural network analyses of FIG. 13 applied to four different images of the damaged automobile.
Figure 15:
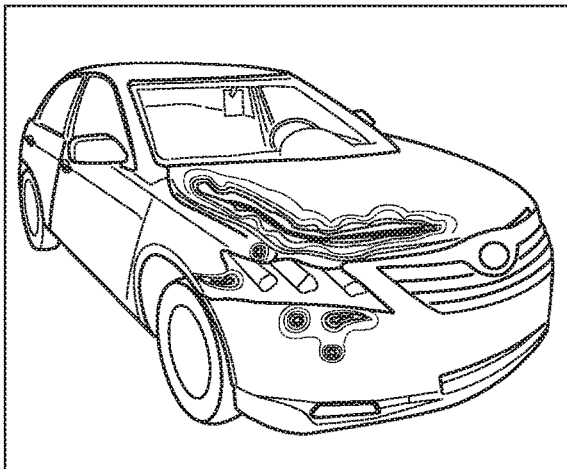
Figure 15:
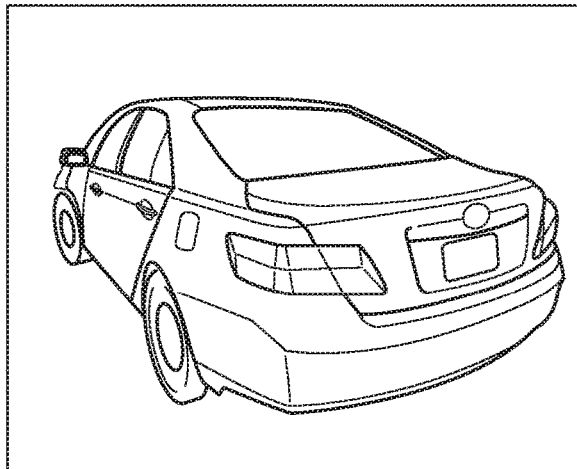
Figure 15:
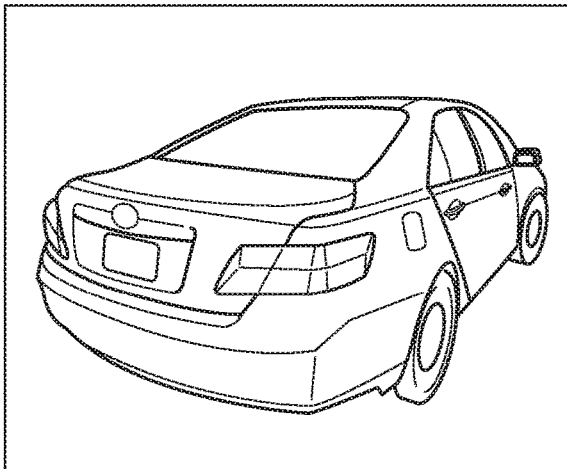

As illustrated in FIG. 3, after one or more of the target vehicle images have been processed, a block 316 may display the results of the analysis to a user. One manner of providing such results is through the use of a visual or graphical "heat map" which illustrates the target vehicle with indications of damage as determined by the routine 300 displayed on the image, for example, such as previously described with respect to the block 210. A heat map may be created, for example, by converting the damage parameter values at each image pixel or surface segment to colors (or some other visual indication) and displaying these indications on the target vehicle image, to illustrate the damage or change determination at each location of the target vehicle or other target object. As such, a heat map may be included in, superimposed on, overlaid on, or otherwise applied to an image of a vehicle to thereby indicate changes (e.g., damages) at various locations on the target vehicle. In an example, a heat map is applied to a base model image corresponding to the target vehicle, such as to the image 502 shown in FIGS. 5 and 6. In another example, a heat map is applied to an image of the damaged target vehicle, such as to a raw or source image received at the block 202 (e.g., the image of FIG. 7). In yet another example, a heat map is applied to a damaged target vehicle image that has been generated by any one or more of the image processing techniques described herein, such as to the image shown in FIG. 12. FIG. 14, for example, illustrates a heat map applied to the background eliminated, corrected target vehicle image of FIG. 12, wherein areas of higher damage (or likelihood of damage) are indicated by darker colors. Of course, the block 316 may use colors to indicate damage value gradations. For example, brighter or darker shades of red may be used to indicate areas, locations, or points of higher damage or higher amounts and/or greater severity of damage, or higher likelihoods of actual, occurred damage, with other shades of red or other colors used to illustrate areas with less damage or with less likelihood of damage. In cases in which the routine 300 determines types or probable types of damage, colors, icons, or other indicia may be used to indicate the type of damage (e.g., scratches, folds, dents, bends, etc.). FIG. 15 illustrates an example set of heat maps for the target vehicle of FIG. 14 showing an analysis of each of the four corner images of the target vehicle as determined from target vehicle images. In any event, a heat map may illustrate or otherwise represent damage parameter values or other visual representations of the CNN output values in conjunction with the image of the damaged or target vehicle using different colors or other visible indicia superimposed onto the image of the target vehicle (or the object model image of the target vehicle), to define or illustrate the presence, severity, type, and/or likelihood of damage at each component, pixel, surface segment, or other part of the damaged component of the target vehicle. That is, the damage parameter values generated by the CNNs may be respectively mapped to particular colors and/or other characteristics utilized in the heat map. One or more heat maps may be included in, superimposed or overlaid onto, and/or otherwise applied to an image of a vehicle to thereby indicate damage parameter values corresponding to various locations on the vehicle. Additional discussion of heat maps is provided in a later section.

Moreover, as illustrated in FIG. 3, a block 318 may use the heat map (e.g., as generated at the block 210 of FIG. 2) and/or may use the damage parameter values generated by the CNNs 134 (e.g., as generated at the block 208 of FIG. 2) for each body panel to determine which body panels or other parts of the target vehicle are damaged, the type of damage, the extent of the damage, etc. The block 318 may analyze the damage parameter values from multiple images for the same body panel to determine the amount of damage to the entire panel. Based on this determination, the block 318 may determine whether an entire body panel needs to be replaced, whether the body panel needs to be repaired, the type and extent of repair that needs to be performed on the body panel, etc. In some cases, the block 318 may perform an analysis for each of the body panels within the target vehicle based on a single image or based on multiple images. Still further, the evaluation or determination of damage to the same body panel or body component from different images may be averaged, added or otherwise mathematically associated with one another to determine an overall evaluation of the damage to the body panel or component. This coordination may be necessary because, in some cases, the complete damage to a particular body panel may not be viewable or completely viewable from a single target vehicle image, and may instead only be determined from multiple different target vehicle images.

As illustrated in FIG. 3, a block 320 may then use the damage determination (e.g., the damage parameter values generated by the CNNs and/or the heat map) for secondary purposes. Such secondary considerations or evaluations may be related to or dependent on the damage determination, such as previously discussed with respect to the block 212 of FIG. 2. For example, the block 320 may use the damage determination to determine each of the parts of the target vehicle that needs to be replaced, each of the parts that need to be repaired (and potentially the type of repair), etc. The block 320 may identify particular types of work that need to be performed with respect to various ones of the body panels, such as repainting, replacing, filling creases or gaps, etc. Still further, the block 320 may use the identification of the damage and/or of the types of damage, and/or amount of damage to determine an estimate of the repair costs associated with repairing each of the body components or panels, including costs associated with replacing such panels, the costs of repairing such panels, etc. For example, the identification of the damage and/or the types of damage detected for the target vehicle may be provided to a system and/or a method that automatically predicts and recommends parts, materials, and services needed for repairing the target vehicle, such as the systems and methods described in co-owned U.S. Pat. No. 9,218,626 entitled "Automatic Prediction and Recommendation of Parts, Materials, and Services for Vehicle Insurance Claim Estimates and Supplements," the contents of which are hereby expressly incorporated by reference herein.

In one case, the quantification of damage as determined, for example, from the blocks 312, 316, and/or 318, may be applied as an input to a statistically based estimating program or predictive model, such as an estimating program or predictive model that has been generated by one or more regression analyses performed on stored training data, which may include historical data related to damaged vehicles. The quantification of damage is applied as an input to the estimating program or predictive model to estimate and/or predict various parameters related to repairing the target vehicle, such as the cost of repair, the time it takes to repair the vehicle, the likelihood of a re-inspection of the vehicle, an insurance claim cost, etc. The statistically based estimating program or predictive model may be a program, routine, or model such as that described in co-owned U.S. patent application Ser. No. 12/792,104, entitled "Systems and Methods of Predicting Vehicle Claim Cost" and filed on Jun. 2, 2010; co-owned U.S. patent application Ser. No. 14/218,165, entitled "System and Method of Predicting Vehicle Claim Information Based on Image Attributes" and filed on Mar. 18, 2014; co-owned U.S. patent application Ser. No. 14/460,907, entitled "System and Method of Predicting Vehicle Claim Information based on Image Attributes" and filed on Aug. 15, 2014; co-owned U.S. patent application Ser. No. 14/168,345, entitled "System and Method of Predicting a Vehicle Claim Supplement between an Insurance Carrier and a Repair Facility" and filed on Jan. 30, 2014; co-owned U.S. patent application Ser. No. 14/168,327, entitled "Systems and Methods of Predicting Vehicle Claim Re-Inspections" and filed on Jan. 30, 2014; co-owned U.S. patent application Ser. No. 14/218,148, entitled "System and Method of Predicting Vehicle Claim Information based on Deformation Images" and filed on Mar. 18, 2014; co-owned U.S. patent application Ser. No. 15/016,756, entitled "Imaging Processing System for Identifying Parts for Repairing a Vehicle" and filed on Feb. 5, 2016; co-owned U.S. patent application Ser. No. 15/079,356, entitled "Image Processing System for Vehicle Damage" and filed Mar. 24, 2016; and/or co-owned U.S. patent application Ser. No. 15/079,380, entitled "Image Processing System for Vehicle Damage" and filed on Mar. 24, 2016, the contents of each of which are hereby expressly incorporated herein.

In some implementations, the statistically based estimating program or predictive model to which the quantification of damage is provided as input is generated based on historical data related to damaged vehicles. For example, the estimating program or predictive model may have been generated a priori (or, in some cases, may be generated in real-time or on-demand) based on one or more regression analyses, principal components analyses, cluster analyses, etc. of the historical data. The historical data related to damaged vehicles is stored in a data storage device or system which may be accessible to the image processing system 100, and may include vehicle repair cost data, repair time data, re-inspection data, parts data, imaging data, insurance claim data, telematics data, etc. for various types of damage and/or previous repairs to the vehicles of the same make, model, year, type, etc. Further, the regression or other analyses that are utilized to generate the estimating program or predictive model can be run using many factors that account for many different variables that might affect the costs of repair or replacement, such as the city or state in which the vehicle is located, the type of vehicle, the identity of the insurance carrier or company paying for the components (which may have different methodologies of obtaining parts or components, such as using only new parts, using only replacement or used parts where possible), etc. At any rate, the estimating program or predictive model that receives the quantification of damage of the target vehicle as input may determine, based on the input, an estimate of damage or repair costs for the target vehicle, the likelihood that a component needs to be replaced, repainted, etc., the costs of such a repair or replacement, the time needed for repair or replacement, etc. In some scenarios, additional data corresponding to the target vehicle, such as telematics data associated with the damaged vehicle, is provided to the estimating program or predictive model as input in conjunction with the quantification of damage.

Figure 16:
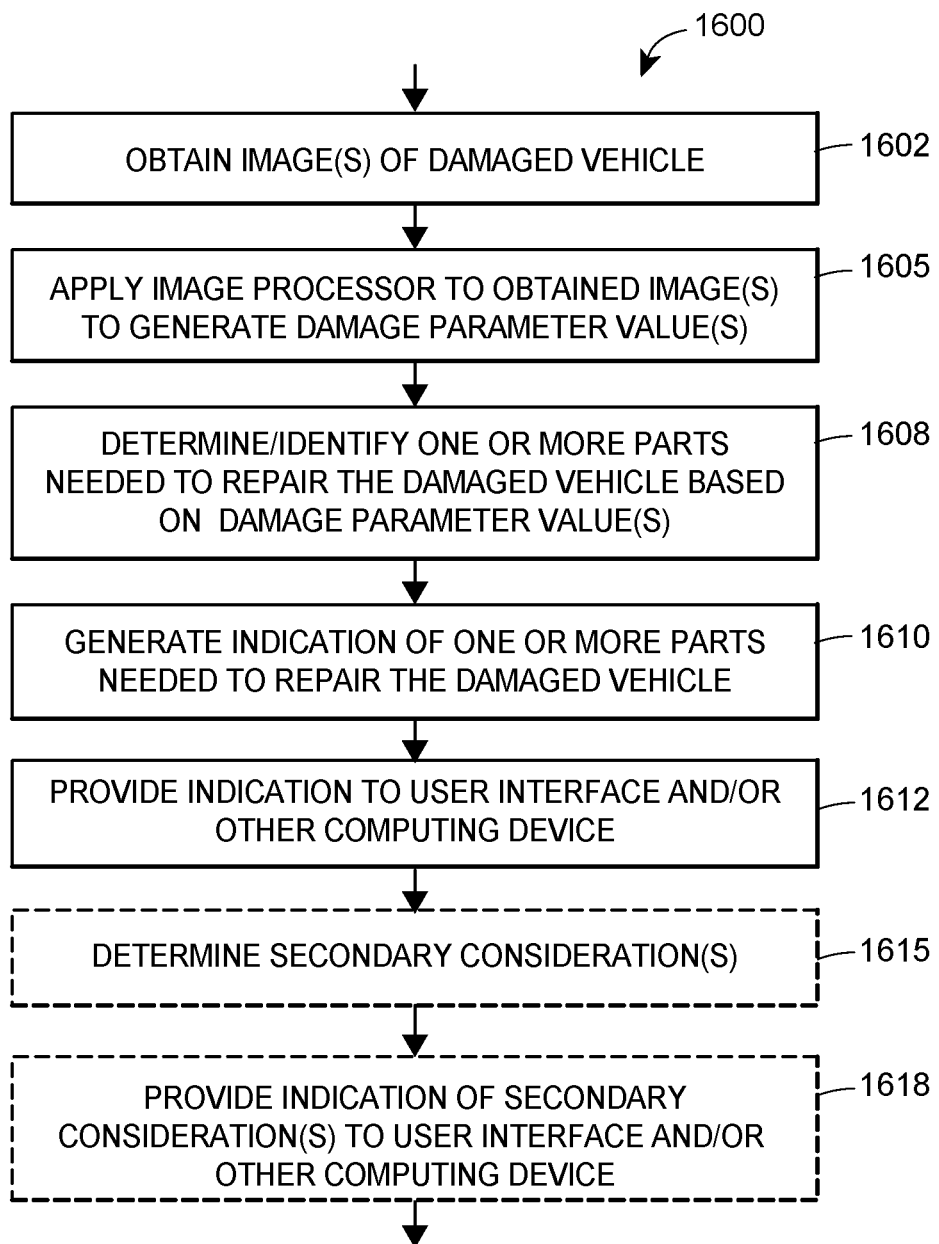
FIG. 16 depicts a flow diagram of an example method of using an image processing system to repair a damaged vehicle using an image processing system.

With further regard to the blocks 318, 320 of FIG. 3 and the block 212 of FIG. 2, a flow diagram of an example method 1600 for using an imaging processing system for repairing a damaged vehicle is depicted in FIG. 16. The method 1600 may be performed by any one or more portions of the image processing system 100 of FIG. 1, the system 200 of FIG. 2, or other systems. Additionally or alternatively, the method 1600 may operate in conjunction with the heat maps described in FIGS. 14 and 15, and/or with any one or more of the other methods described herein, or with other methods.

At a block 1602, the method 1600 includes obtaining one or more source images of a target vehicle that has been damaged, e.g. in a manner such as that previously discussed with respect to the block 302 of FIG. 3. For example, at the block 1602, the one or more source images of the target vehicle may be communicatively received via a link or communication interface, the one or more images may be obtained from a data storage area, etc. The obtained images may include two-dimensional images and/or three-dimensional images.

At a block 1605, the method 1600 includes applying an image processor to the source images to thereby generate a set of values corresponding to the damage of the target vehicle (e.g., to generate a set of damage parameter values). For example, one or more of the blocks 202-208 of the system 200 may be applied to the obtained source images of the damaged vehicle to determine occurrences of damage at various locations, points, or areas of the vehicle, and to generate a set of damage values corresponding to the determined damage. Each value included in the generated set of values may respectively correspond to respective damage at a respective location of the damaged vehicle. A particular damage value may correspond to a degree of severity of respective damage at a particular location on the target vehicle, a level of accuracy of the degree of severity of the respective damage at the particular location on the target vehicle, a type of damage at the particular location on the target vehicle, or a likelihood of an occurrence of any damage at the respective location on the target vehicle, for example.

In an example implementation, applying the image processor to the obtained source images of the target vehicle (block 1605) includes evaluating the obtained source images and selecting one or more suitable images therefrom based on the evaluation, e.g., in a manner such as that previously discussed with respect to the block 304. For example, the image collector/selector/evaluator 202 of FIG. 2 may evaluate a set of obtained images and select a subset of source images that are suitable for determining damage to the target vehicle.

In some configurations, the image processor that operates on the source images (block 1605) includes a damage determiner (e.g., the block 208 of FIG. 2) that applies one or more convolutional neural networks to one or more of the obtained source images of the target vehicle, or to a composite image of the target vehicle generated from the obtained source images to detect or determine damage at the target vehicle, and the set of values corresponding to the damage at the target vehicle are output by the one or more convolutional neural networks. For example, one or more convolutional neural networks are applied to one or more source images of the target vehicle in a manner such as previously discussed with respect to the block 312 of FIG. 3. Each convolutional neural network may be applied to a different segment, panel, component, or portion of the target vehicle as represented or depicted within the vehicle image (s), if desired. In some scenarios, the block 1605 includes selecting a particular convolutional neural network that is to be applied to a particular segment of the target vehicle or representation thereof included within the obtained source images.

In some scenarios, applying the image processor to the obtained images (block 1605) includes generating a composite image of the target vehicle from a plurality of obtained source images of the target vehicle, such as by using the composite image generator 204 of FIG. 2. Additionally or alternatively, in some scenarios, applying the image processor to the obtained source images (block 1605) includes aligning the composite image of the target vehicle with a base model image of vehicle to determine the damage and locations of the damage at the target vehicle, such as by using the image aligner 206 of FIG. 2, and/or in a manner such as previously discussed with respect to the block 308 of FIG. 3. For instance, at least some of the plurality of source images are two-dimensional images, and the composite image and the base model image are three-dimensional images.

In some scenarios, applying the image processor to the obtained images (block 1605) includes generating a heat map that corresponds to damage to the target vehicle that has been determined by the image processor. For example, the image processor that operates on the obtained images (block 1605) includes a heat map generator, such as the heat map generator 210 of FIG. 2, which may generate the heat map in a manner such as previously discussed with respect to the block 316 of FIG. 3.

At a block 1608, the method 1600 includes determining or identifying, based on a particular value included in the set of damage parameter values generated by the image processor, one or more parts that are needed to repair the vehicle. The particular damage parameter value operated on at the block 1608, may be directly obtained (e.g., via the change determiner 208), or may be obtained from a generated heat map (e.g., via the heat map created by the heat map generator 210). In an example implementation, in order to determine or identify the one or more parts are needed to repair the vehicle (block 1608), the particular location corresponding to the obtained, particular damage parameter value is determined, and a larger or more comprehensive set of parts for the target vehicle is filtered (e.g., by using one or more of the filters 218 of FIG. 2) based on the particular determined location, based on the particular component or segment of the target vehicle on which the particular location is disposed, and/or, in some cases, based on other components or segments of the vehicle that are adjacent to the particular component or segment. Examples of systems and methods for filtering a set of vehicle parts and making recommendations of parts therefrom based on detected damaged are described in aforementioned U.S. Pat. No. 9,218,626, which may operate in conjunction with any one or more portions of the present disclosure, including any one or more portions of the method 1600.

One or more particular parts included in the filtered set of parts may be selected at the block 1608, e.g., based upon the value of the particular damage parameter corresponding to the particular location. For instance, if the particular damage value indicates a severity of damage greater than a threshold, all parts in the filtered set may be selected. In another instance, if the particular damage value is within a certain range, a subset of the filtered set of parts may be selected. The selection of a specific part or a specific group of parts from the filtered set may be based upon the particular damage value as compared to one or more thresholds and/or to one or more ranges, for example. In some cases, the selection of a specific part or specific group of parts is additionally or alternatively based on respective damage values corresponding to other locations of the particular component or segment of the vehicle on which the particular location is disposed, and/or is based on respective damage values corresponding to one or more components or segments on the target vehicle that are adjacent to the particular component or segment on which the particular location is disposed. The filtering and selecting to determine/identify the one or more parts needed to repair the vehicle may be performed integrally or as sequential procedures, as desired. In some scenarios, filtering and selecting to determine/identify the one or more parts is performed iteratively.

In some situations, in addition to or as an alternative to filtering and selecting to determine/identify the one or more parts are needed to repair the vehicle, determining or identifying the one or more parts that are needed to repair the vehicle (block 1608) includes predicting one or more parts that are needed to repair the vehicle. In an example, one or more of the damage values generated by the image processor and/or at least a portion of the heat map generated by the image processor (block 1605) are provided to a predictive parts model that has been generated based on historical imaging data, parts data, telematics data, and/or repair data for a plurality of vehicles (e.g., one of the one or more of the predictive models 215 of FIG. 2). The predictive parts model may have been generated a priori (or may be generated in real-time or on-demand) based on one or more regression analyses and/or other types of statistical analyses performed on the historical data, for instance. The predictive parts model receives one or more damage parameter values and/or the heat map as inputs, and generates therefrom as an output an indication of the one or more parts needed to repair the vehicle. Examples of the creation and usage of such predictive parts models may be found, for example, aforementioned U.S. patent application Ser. Nos. 14/218,165; 14/460,907; 14/218,148; 15/016,756; 15/079,356; and Ser. No. 15/079,380, any number of which may operate in conjunction with any one or more portions of the present disclosure, including any one or more portions of the method 1600.

With further regard to the block 1608, in some implementations, determining or identifying one or more parts needed to repair the vehicle includes selecting one or more parts that are needed to repair the vehicle based on an availability of parts, either individually and/or as an integral unit. For example, consider a scenario in which the set of damage parameter values generated at the block 1605 indicates that a driver door, driver door handle, driver door window, and mechanism for raising and lowering the window are damaged and need to be replaced. In this scenario, the block 1608 may include determining a respective availability of each of the individual parts, e.g. each of the driver door, driver door handle, driver door window, and the mechanism for raising and lowering the window. If one or more of these individual parts are not currently available or not available within a desired window of time, instead of selecting each part individually, the block 1608 may select an integral door unit that includes therein the handle, the window, the mechanism for raising and lowering the window, as well as other parts. In a similar manner, the block 1608 may additionally or alternatively include selecting one or more parts based on cost. For example, if the sum of the individual costs for the driver door, driver door handle, driver door window, and mechanism for raising and lowering the window is greater than the cost of integral door unit that includes the individual parts, the block 1608 may select the integral door unit instead of the individual parts.

At any rate, at a block 1610, the method 1600 includes generating an indication of the one or parts needed to repair the vehicle, e.g., as determined/identified at the block 1608. At a block 1612, the indication is provided to at least one of a user interface or to another computing device. In some scenarios, providing the indication of the one or more parts needed to repair the vehicle (block 1612) includes ordering the one or parts needed to repair the vehicle. For example, the indication of the one or more parts needed to repair the vehicle may be electronically transmitted to a parts ordering system, a parts procurement system, or a parts store.

In some scenarios, the method 1600 optionally includes determining one or secondary considerations (block 1615), e.g., based on one or more values included in the set of values generated by the image processor (block 1605), and/or based on the one or more parts that have been determined, identified, and/or selected (block 1608). Examples of secondary considerations include the cost of repairing the damaged vehicle and/or of repairing a portion thereof, a likelihood that a part or component needs to be replaced, repainted, etc., an estimated time for completing the repair or replacement, an identification of the types of work that need to be performed to repair and/or replace one or more parts or components (e.g., repainting, replacing, filling creases or gaps, etc.), a likelihood of an occurrence of a re-inspection, an insurance cost corresponding to the damaged vehicle, and/or other secondary considerations. Examples of secondary considerations that are related to insurance costs corresponding to the damaged vehicle include a cost of an insurance claim, an out-of-pocket cost for an insured party, a cost of a supplement to the insurance claim, and/or other insurance costs, such as those described in aforementioned U.S. patent application Ser. Nos. 12/792,104; 14/218,165; 14/460,907; 14/168,345; 14/168,327; 14/218,148; 15/016,756; 15,079,356; and Ser. No. 15/079,380.

In some implementations, determining the one or more secondary considerations (block 1615) includes predicting the one or more secondary considerations, such as in a manner previously discussed with respect to the block 212 of FIG. 2 and/or the block 320 of FIG. 3. In an example, the block 1615 includes providing an indication of one or more damage parameter values and/or of one or more portions of the heat map generated by the image processor (block 1605) to a predictive model generated based on one or more statistical analyses (e.g., one or more regression analyses, principal components analyses, etc.) performed on historical claim data, cost data, repair time data, re-inspection data, parts data, imaging data, etc. for a plurality of vehicles. For instance, the predictive model is one of the predictive models 215 of FIG. 2. In some embodiments, the indication of one or more determined/identified/selected parts (block 1608) is provided to the predictive model. The predictive model receives the indication of the one or more damage values, the one or more portions of the heat map, and/or the indication of the one or more parts as input, and outputs a resulting indication of predicted or estimated one or more secondary considerations, for example. Examples of the creation and usage of such predictive models may be found, for example, in aforementioned U.S. patent application Ser. Nos. 12/792,104; 14/218,165; 14/460,907; 14/168,345; 14/168,327; 14/218,148; 15/016,756; 15, 079,356; and Ser. No. 15/079,380.

In an optional block 1618, the method 1600 includes providing an indication of the determined secondary consideration(s) to a user interface and/or to another computing device.

It is noted that, in a preferred implementation, the method 1600 is performed without utilizing (e.g., exclusive of) any user input. That is, aside from optionally providing an initial set of source images of the damaged vehicle for image processing (block 1602), other blocks (and in some cases, all blocks) of the method 1600 are performed by an image processing system, such as the image processing system 100 of FIG. 1 or the system 200 of FIG. 2, and not by a human being or person.

Figure 17:
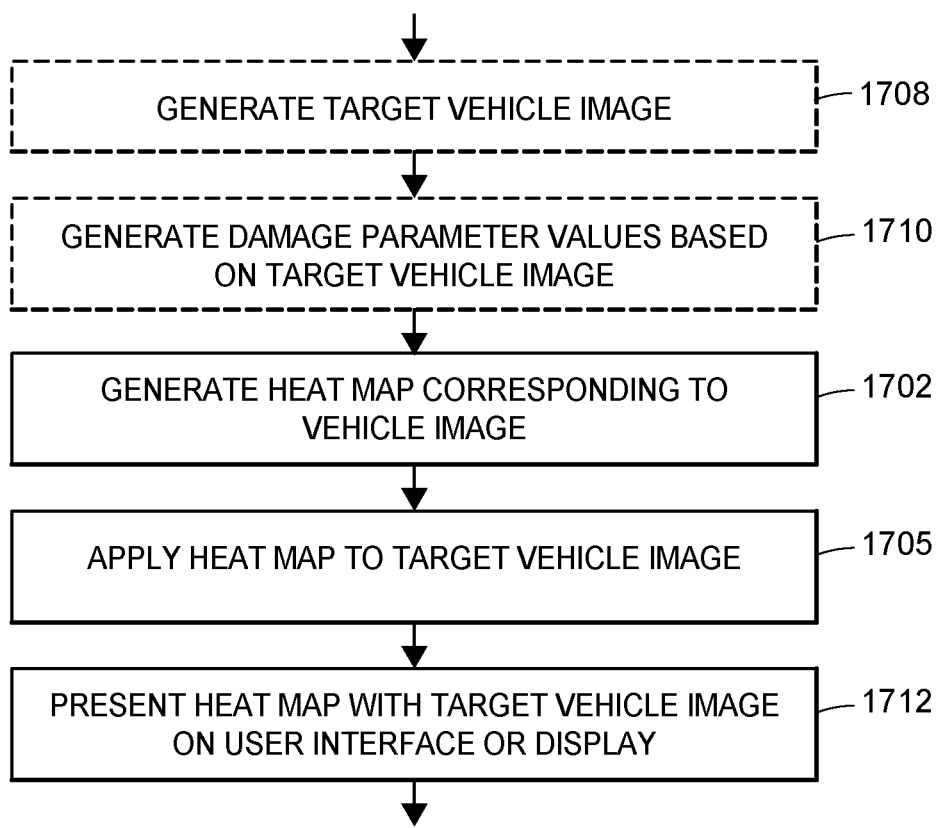
FIG. 17 depicts a flow diagram of an example method for providing vehicle damage information via a heat map.

Now turning again to heat maps (such as those previously described with respect to the block 210, the block 316, and elsewhere within the present disclosure), FIG. 17 depicts a flow diagram of an example method 1700 for providing vehicle damage information via a heat map on a user interface and/or a display. The method 1700 may be performed in conjunction with any number of portions of the image processing system 100 of FIG. 1, the system 200 of FIG. 2, the heat maps described in FIGS. 14 and 15, and/or any one or more of the methods described herein.

At a block 1702, the method 1700 includes generating a heat map corresponding to vehicle damage. The heat map includes a plurality of different colors, different gradations of colors, and/or other visual indicators, each of which represents or is indicative of a particular value corresponding to damage or change to a vehicle. For example, each different color, color gradation, and/or other visual indicator may represent or be indicative of a respective amount of damage, a level of accuracy of an estimated or predicted amount of damage, a type of damage, and/or a probability or likelihood of an occurrence of damage at a respective location, point, or area of or on the vehicle.

At a block 1705, the method 1700 includes applying the heat map to an image corresponding to a target vehicle. The image corresponding to the target vehicle to which the heat map is applied (block 1705) may be an image of the damaged target vehicle (such as a raw or source image as illustrated in FIG. 7, or a composite image generated via image processing as illustrated in FIG. 12). Alternatively, the image corresponding to the target vehicle to which the heat map is applied (block 1705) may be a base model image of a vehicle that corresponds to the target vehicle, but does not include the damage incurred by the target vehicle (e.g., the base model image as illustrated in FIG. 5). Further, the image of the target vehicle to which the heat map is applied (block 1705) may be a two-dimensional image or may be a three-dimensional image. For ease of reading, such an image to which a heat map is applied (block 1705) (whether raw, source, or composite; and whether two-dimensional or three-dimensional) is generally referred to herein as a "target vehicle image" or an "image of a target vehicle."

Applying the heat map to the image of the target vehicle (block 1705) may be performed using any suitable technique, such as superimposing the heat map on the image of the target vehicle, overlaying the heat map onto the image of the target vehicle, incorporating the heat map into the image of the target vehicle, etc. At any rate, the heat map is applied to the target vehicle image (block 1705) so that a respective color or characteristic at respective location on the heat map corresponds to respective damage at a corresponding location on the target vehicle.

For scenarios in which the image of the target vehicle to which the heat map is applied (block 1705) is a composite image of the target vehicle, the method 1700 may optionally include generating the composite, target vehicle image (block 1708). In an example, the method 1700 includes generating a composite, three-dimensional image of the target vehicle (block 1708) from a plurality of two-dimensional raw or source images of the target vehicle. Additionally or alternatively, generating the composite image of the target vehicle (block 1708) includes aligning one or more raw or source images of the target vehicle with a base model image corresponding to the target vehicle. Generally speaking, the image of the target vehicle may be generated (block 1708) by using any one or more of the image processing techniques described herein, such as those previously described with respect to the blocks 202-208 of FIG. 2.

In some scenarios, the method 1700 optionally includes generating values of damage or change parameters corresponding to the target vehicle (block 1710). Generally, the values of damage parameters corresponding to the target vehicle may be generated by performing image processing on the target vehicle image. For example, the damage parameter values corresponding to the target vehicle may be generated by performing change detection image processing of the target vehicle image in which the target vehicle image is compared with a base model image corresponding to the target vehicle, e.g., in a manner such as previously described with respect to block 208. In one of many implementations, one or more convolutional neural networks may be applied to one or more portions of the target vehicle image to detect the existence of change, the likelihood of the existence of change, the degree of change, and/or a quantification of change (e.g., damage) to the target vehicle with respect to the base model image. The values of the damage or change parameters corresponding to the target vehicle may be determined based on the output(s) of the CNN(s) applied to the target vehicle image, for example.

For scenarios in which the method 1700 includes the block 1710, the damage parameter values generated at the block 1710 are provided to the block 1702 for generating the heat map corresponding to the target vehicle, as illustrated in FIG. 17. For example, generating the heat map of the target vehicle (block 1702) includes mapping one or more damage parameter values generated at the block 1710 to a particular color, gradation of color, and/or other visual indicator, which may then be applied to particular pixels or locations on the heat map to visually indicate respective values of the one or more damage parameters corresponding to respective locations on the target vehicle.

At a block 1712, the method 1700 includes presenting the image of the vehicle with the heat map on a user interface or display, thereby providing damage information corresponding to various locations on the vehicle on the user interface or display. For example, each respective color of the heat map at a respective location on the image of the target vehicle is indicative of respective damage information corresponding to a respective location on the target vehicle itself.

In some scenarios, the image of the vehicle presented with the heat map on the user interface (block 1712) may include one or more user controls (not shown). In these scenarios, a user may be able to select a particular user control corresponding to a particular location on the displayed heat map. For example, a user may click on or hover over a desired particular location on the displayed heat map. Upon reception of the user selection of the particular location on the heat map, the method 1700 includes presenting additional information corresponding to the particular location of the target vehicle indicated by the user selection. The additional information may include, for example, a quantitative indication of a degree of severity of damage at the particular location of the target vehicle, a quantitative indication of an accuracy of a determined occurrence of the respective damage at the particular location of the vehicle, an indication or identification of particular types of damage at the particular location of the vehicle, an identification of one or more vehicle parts that are damaged and that correspond to the particular location of the vehicle, an identification of at least one vehicle part that corresponds to the particular location of the vehicle to order for repairing the vehicle, and/or other information corresponding to respective damage at the particular location of the vehicle. The additional information may be presented at the user interface or display in a pop-up window or other suitable presentation format.

In some scenarios, presenting the heat map at the user interface or on the display (block 1712) includes presenting, at the user interface or on the display in conjunction with the heat map, a user control which, when activated, launches an application that utilizes at least some of the information that corresponds to the target vehicle and that is indicated by the heat map (not shown). In an example, the launched application, when executed, determines one or more secondary characteristics and/or features associated with the damaged vehicle based on the provided vehicle damage information, such as one or more cost estimates associated with repairing or replacing the damaged vehicle or parts of the damaged vehicle, an estimate of the time it may take to repair the damaged vehicle, a change in state of the damaged vehicle or a part thereof, etc. In some cases, the launched application performs additional post-processing on the determined secondary considerations. For example, the launched application may utilized the determined secondary considerations to estimate insurance settlements, estimate insurance payouts, order parts for pairing the damaged vehicle, and/or perform other post-processing on secondary consideration data generated by the image processing system 100. Additional details on post-processing of data generated by the image processing systems and/or methods of the present disclosure are discussed elsewhere herein with respect to block 212 of FIG. 2.

As previously discussed, in some scenarios, generating a heat map corresponding to the damaged vehicle (block 1702) is based on performing one or more image processing techniques, e.g., by utilizing one or more of the image processing techniques discussed with respect to blocks 202-208 of FIG. 2. Accordingly, in some embodiments the method 1700 (not shown), the method 1700 may include determining a level of quality of the heat map generated at the block 1702, and modifying the image processing of one or more images of the vehicle based on the determined level of quality of the generated heat map. The modifications may include, for example, selecting additional or alternative raw or source images of the vehicle for image processing, prompting the user to provide additional or alternative raw or source images of the vehicle, adjusting the size of a particular image area of a vehicle segment to which a CNN is applied (e.g., change from a 16 pixel square to a four pixel square), adjusting the scan distance between subsequent image areas to which a CNN is applied (e.g., change from scanning every fifth pixel to scanning every second pixel), and/or other modifications to the image processing techniques performed at one or more of the blocks 202-208. A revised image of the damaged vehicle may be generated using the image processing modifications, and a revised heat map corresponding to the damaged vehicle may be generated based on the revised image of the damaged vehicle. The determination of the level of quality of the heat map, the determination of the particular modifications that are to be made to the image processing of the images of the vehicle, and/or the execution of the particular image processing modifications may be automatically performed without any user input, e.g., may by embodiments of the image processing systems and/or methods described herein.

FIG. 18 illustrates a flow diagram of a method 1800 of analyzing images using image models, and facilitating various functionalities associated therewith. The method 1800 may be facilitated by one or more components of a system. For example, the method 1800 may be performed by any combination of the computing devices 106, the image processing routines, the training routines, and/or other components of the image processing system 100 as discussed with respect to FIG. 1. For purposes of explanation, the method 1800 will be described as being performed by a server. It should be appreciated that the depicted functionalities of the method 1800 are merely exemplary and that additional or alternative functionalities are envisioned.

The method 1800 may begin when the server optionally accesses (block 1805) telematics data associated with a target vehicle. In embodiments, the server may receive the telematics data from an electronic device associated with the target vehicle (e.g., an on-board electronic device of the target vehicle or an electronic device of an operator of the target vehicle such as one of the user interface devices 102 as discussed with respect to FIG. 1), or may receive or access the telematics data from another source. The server may also optionally identify or estimate (block 1810) any damage to the target vehicle from the telematics data. In particular, the server may analyze the telematics data to identify any specific damage to the target vehicle as well as characteristics thereof, such as a degree of damage, locations of the damage, and/or other information.

Based on the telematics data, the server may optionally determine (block 1815) whether a first notice of loss (FNOL) event has occurred, where the FNOL event may represent a partial or full loss of an insured product such as the target vehicle. In an implementation, the server may receive a notice of FNOL separate from accessing or analyzing the telematics data, such as by receiving a notice from an insurance provider or from an individual associated with the target vehicle. Otherwise, to determine whether an FNOL event has occurred, the system may reference the damage assessment of block 1810.

Generally, if the telematics data indicates damage or loss to the target vehicle, then the server may deem that an FNOL has occurred ("YES"), and processing may proceed to block 1820. In contrast, if the telematics data does not indicate damage or loss to the target vehicle, then the server may deem that an FNOL has not occurred ("NO"), and processing may end or proceed to other functionality. In an implementation, the server may automatically and consistently poll for updated telematics data to determine whether an FNOL has occurred.

At block 1820, the server may optionally request an electronic device to transmit a set of images. It should be appreciated that the electronic device may be the same device as or a different device from the device from which the server received the telematics data. In an implementation, the server may request the user interface device 102 as discussed with respect to FIG. 1 to transmit the set of images. In embodiments, the request may include information for an individual to reference in association with capturing the set of images, including which views or perspectives of the target vehicle are needed (e.g., images taken of the target vehicle from each of the "four corners", which vehicle components need to be depicted (e.g., hood, trunk, bumper, doors, etc.), and/or other information.

The server may receive (block 1825), from the electronic device via a network connection, a set of images depicting the target vehicle. In embodiments, the server may receive the set of images regardless of whether the server accesses or receives any telematics data associated with the target vehicle. In an implementation, the individual associated with the target vehicle may use the electronic device to capture the set of images and transmit the set of images to the server. An application that may be installed on the electronic device may guide the individual through the image capture, such as by displaying a set of interfaces and instructions associated therewith that instruct the individual to capture any needed image perspectives and vehicle components.

The server may examine the set of images and identify (block 1830) at least a portion of the set of images, where the portion of the set of images may include or indicate a certain characteristic(s) or quality(ies). In particular, the portion of the set of images may, in comparison to the whole of the set of images, be of higher quality, depict certain vehicle components, be captured from certain perspectives, and/or have other relevant characteristics or qualities. The server may also identify (block 1835) the target vehicle that is depicted in the portion of the set of images. In identifying the target vehicle, the server may use any image recognition or analysis technology to ascertain the make, model, and/or year of the target vehicle.

The server may also identify (block 1840), from the portion of the set of images, a set of information associated with the target vehicle and/or associated with the portion of the set of images themselves. In an embodiment, the server may analyze the portion of the set of images to determine or identify any damage to the target vehicle that is depicted in the portion of the set of images. In the same or an alternative embodiment, the server may analyze the portion of the set of images to identify a general image quality, based on factors such as sharpness, noise, dynamic range, tone reproduction, contrast, color accuracy, distortion, vignetting, exposure accuracy, lateral chromatic aberration, lens flare, color moiré, artifacts, and/or other factors. The server may also identify additional information from the portion of the set of images, as later discussed.

Figure 18A:
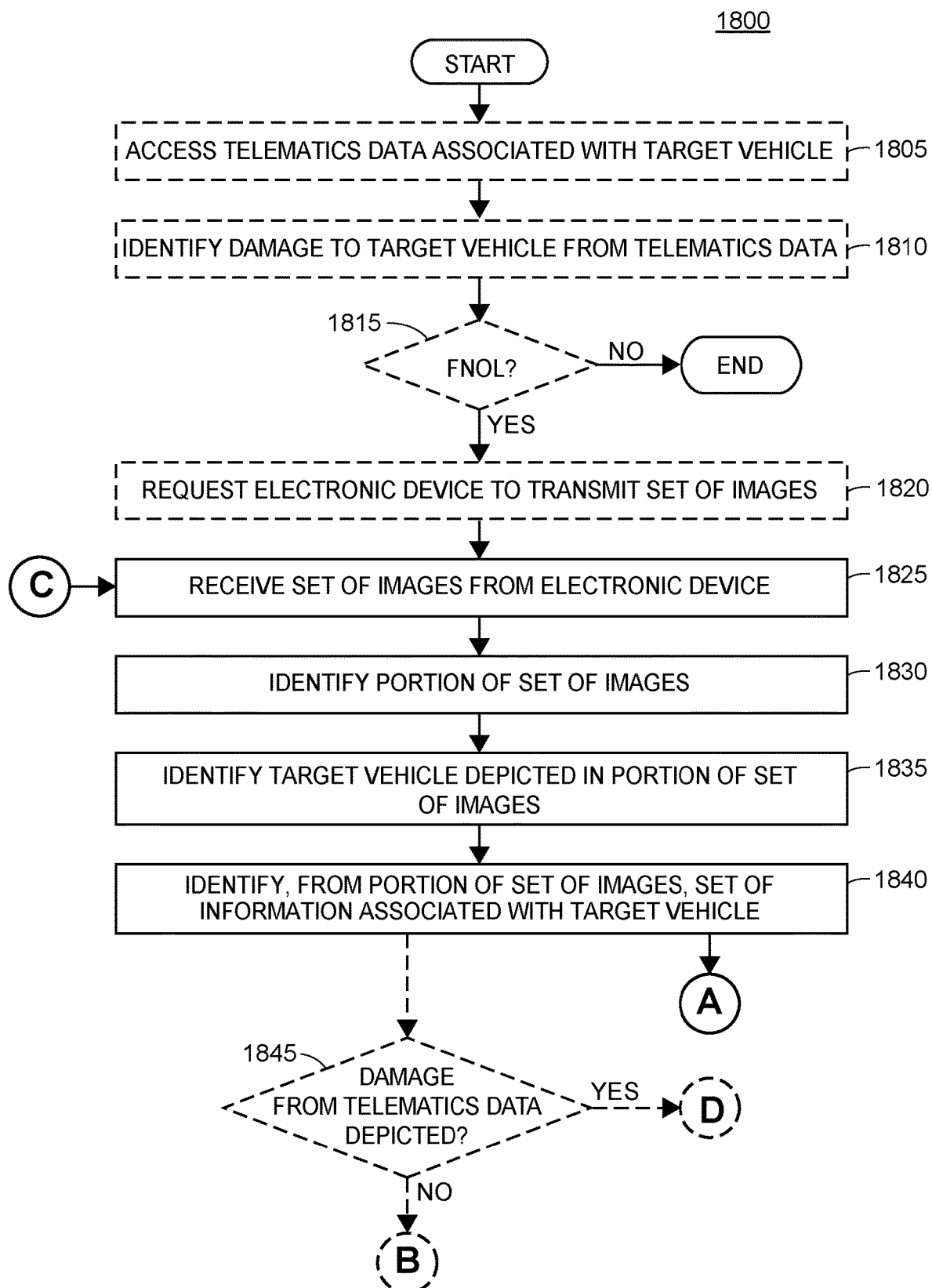
FIGS. 18A and 18B are flow diagrams associated with an example method of analyzing images using image models and facilitating various functionalities associated therewith.
Figure 18B:
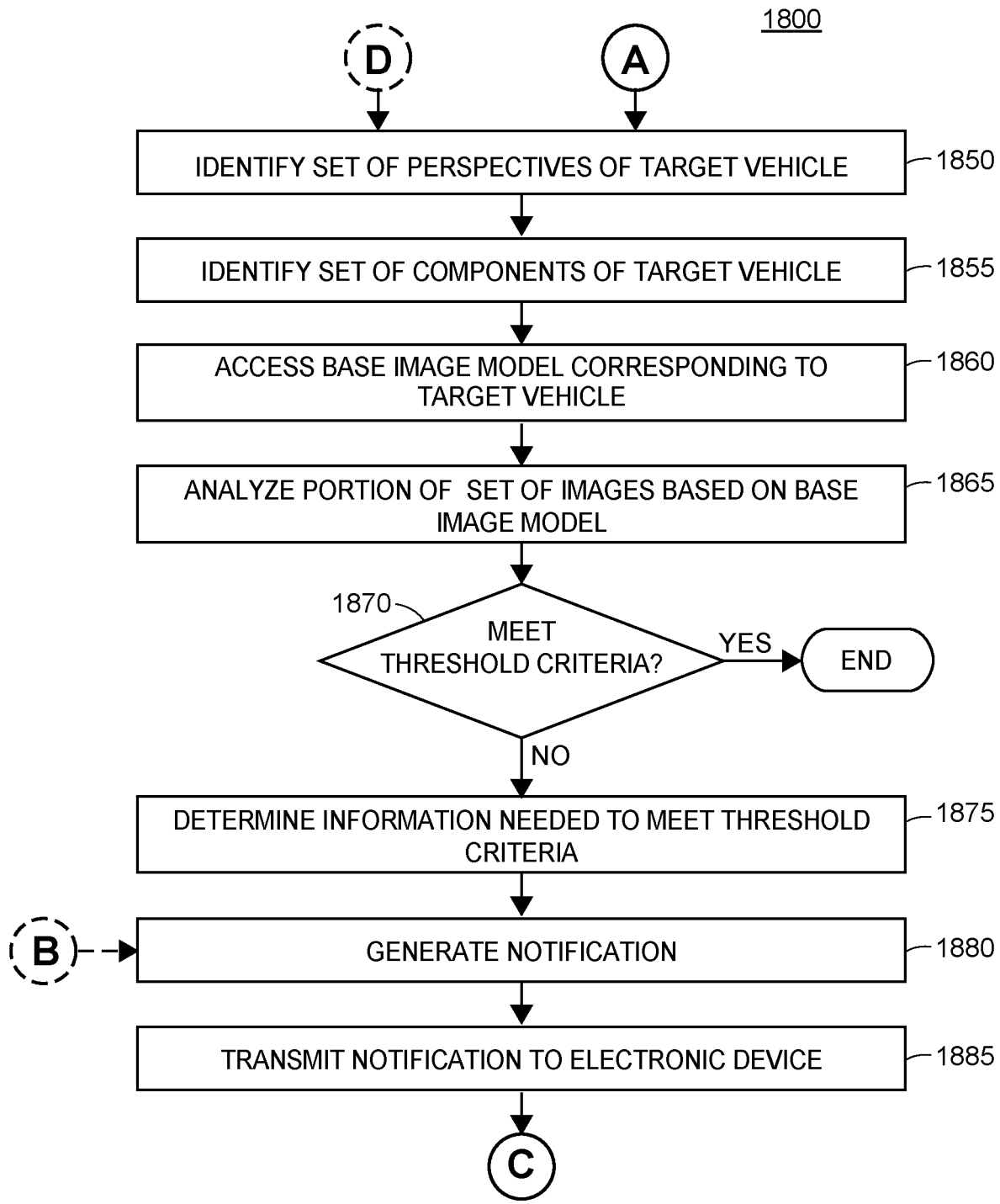

In an implementation, if the server does not access any telematics data in block 1805, processing may proceed to "A" as discussed with respect to FIG. 18B. In contrast, if the server accesses telematics data in block 1805, the server may optionally determine (block 1845) whether the damage indicated in the telematics data (as determined in block 1810) is depicted in the portion of the set of images. In an implementation, the server may determine whether a threshold percentage of the damage indicated in the telematics data is depicted in the portion of the set of images. In another implementation, the server may determine whether there are any discrepancies between the damage indicated in the telematics data and the damage depicted in the portion of the set of images.

For example, both the telematics data and the portion of the set of images may indicate damage to the front bumper of the target vehicle, in which case the server may deem that the depicted damage matches the indicated damage. For further example, the telematics data may indicate damage exclusively to the front bumper without any damage to the passenger's door (but that the telematics data would otherwise detect such door damage), and the portion of the set of images may depict damage to both the front bumper and the passenger's door, in which case the server may deem that the depicted damage does not match the indicated damage. If the server determines that the damage matches ("YES"), processing may proceed to "D" as discussed with respect to FIG. 18B. If the server determines that the damage does not match ("NO"), processing may proceed to "B" as discussed with respect to FIG. 18B.

FIG. 18B depicts additional functionality of the method 1800 as discussed with respect to FIG. 18A. FIG. 18B may begin at "A" at which the server may identify (block 1850) a set of perspectives included in the portion of the set of images depicting the target vehicle, where the set of perspectives may correspond to vantage points from which the portion of the set of images were captured. For example, the set of perspectives may be the "four corners" (i.e., "front right," "front left," "back right," and "back left"). It should be appreciated that alternative or additional perspectives are envisioned. The server may also identify (block 1855) a set of components of the target vehicle that may be depicted in the portion of the set of images. According to embodiments, the set of components may include any element or component of the vehicle that may be depicted in the portion of the set of images including, for example, a front bumper, a hood, headlights, wheels and tires, a back bumper, a trunk, a windshield, a sunroof, front and back windows, a tailgate, doors, a steering wheel, a dashboard, a grill, seats, body panels, and/or other components.

The server may access (block 1860) a base image model corresponding to the target vehicle. In particular, the server may access a base image model that corresponds to the make, model, and/or year of the target vehicle that was identified in block 1835. Generally, the base image model may depict a base vehicle in its pristine or pre-changed condition, where the base vehicle may have the same make, model, and/or year of the target vehicle. In embodiments, the server may remotely or locally access the base image model, such as via a local database or via a remote storage entity.

The server may also analyze (block 1865) the portion of the set of images based on the base image model. In embodiments, the server may determine the need for additional images depicting the target vehicle or additional information associated with the target vehicle. In particular, the server may determine whether any additional perspective (s) is needed, whether any components are not depicted in the portion of the set of images, whether the general image quality is too low, and/or whether the portion of the set of images is deficient in another regard(s). In some situations, the server may optionally ask for or request zoom-in image (s) of a damaged or changed area of the target vehicle to further identify and quantify the damage type/severity, or could ask for or request zoom-out image(s) if not enough of the target vehicle is depicted in a particular image or if damage spans to the edge of the image.

Generally, in analyzing the portion of the set of images, the server may calculate or determine a general quality and completeness of the portion of the set of images, such as by accounting for any need for additional images. The server may then determine (block 1870) whether the determined quality or completeness of the portion of the set of images at least meets a given threshold criteria. Generally, the threshold criteria may account some combination of a sufficient amount and type of image perspective(s), a sufficient amount and type of identified vehicle components, a sufficient image quality, and/or other characteristics. For example, a threshold criteria for a given base image model may specify that "front right," "back right," "front left," and "back left" image perspectives are required, and that a vehicle hood and four (4) doors must be depicted in the portion of the set of images. It should be appreciated that the threshold criteria may vary depending on the base image model.

If the determined quality or completeness of the portion of the set of images at least meets the threshold criteria ("YES"), processing may end or proceed to other functionality. In contrast, if the determined quality or completeness of the portion of the set of images does not at least meet the threshold criteria ("NO"), the server may determine (block 1875) any additional or supplemental information that may be needed to at least meet the threshold criteria. For example, the server may determine that the "front right" perspective of the target vehicle is missing. For further example, the server may determine that the driver's side door (which may be a required component) is unable to be identified from the portion of the set of images.

At block 1880, the server may generate a notification. In particular, the server may generate a notification that includes any information determined in block 1875 and/or other information. Generally, the notification may inform the individual associated with the electronic device that additional image data is needed to properly perform the image analysis functionalities. In some scenarios, such as if the server determines that the damage indicated by the telematics data is not depicted in the portion of the set of images (block 1845 of FIG. 18A, to "B"), the server may generate a notification that instructs the individual to capture images of any or all of the damage that is indicated by the telematics data (or the damage indicated by the telematics data that is not depicted in the initial set of images). In this regard, the damage that may be depicted in any additionally-captured images may confirm (or not confirm) the damage indicated by the telematics data. Further, in this regard, any inaccurate or fraudulent damage information may be determined or identified.

After generating the notification, the server may transmit (block 1885) the notification to the electronic device via the network connection. Accordingly, the individual associated with the electronic device may review the notification, ascertain any additional information or images that may be needed, and take necessary action to fulfill the needed additional information or images (e.g., capture additional images). Processing may then proceed to "C" as shown in FIG. 18A, at which the server may receive (block 1825) any additional images from the electronic device. According to embodiments, the server may perform processing on the additional images as depicted in FIGS. 18A and B, and as discussed herein, until the server identifies a portion of the received images that have qualities and characteristics that at least meet the threshold criteria of the base image model. At this point, the server may facilitate the additional image processing functionalities as discussed herein.

FIGS. 19A-19D illustrate exemplary interfaces associated with capturing images of a target vehicle. One or more electronic devices (e.g., a mobile device, such as a smartphone) may be configured to display the interfaces and/or receive selections and inputs via the interfaces, where the electronic device(s) may be used by an individual associated with the target vehicle. For example, a dedicated application that is configured to operate on the electronic device may display the interfaces. The electronic device may communicate with a server via a network connection. It should be appreciated that the interfaces are merely exemplary and that alternative or additional content is envisioned.

Figure 19A:
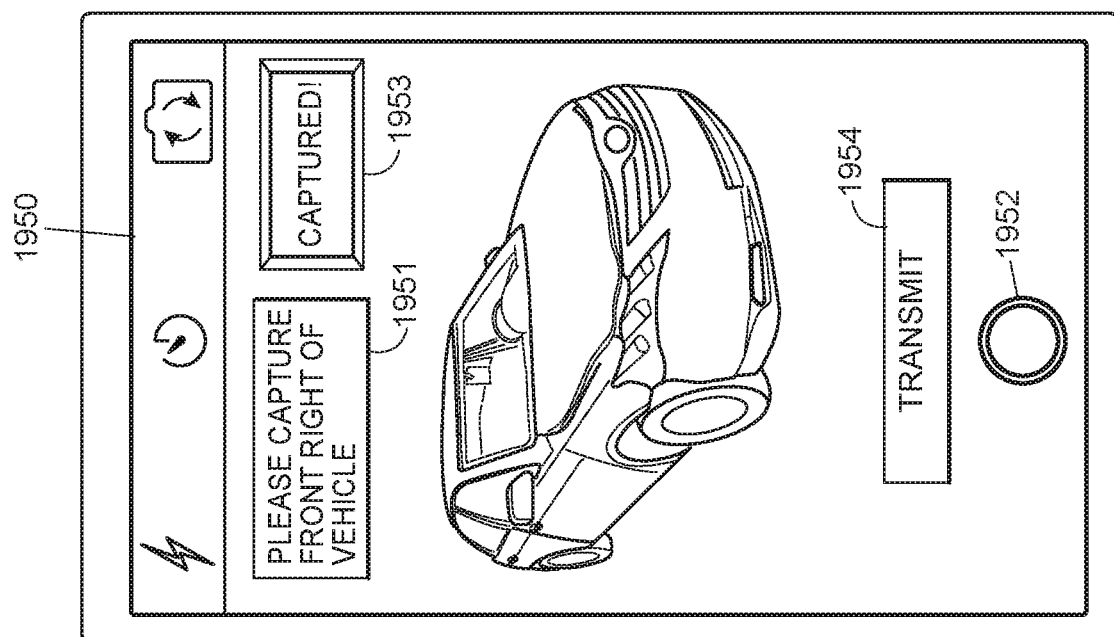
FIGS. 19A-19D depict exemplary user interfaces associated with capturing images of a target vehicle.

FIG. 19A illustrates an example interface 1950 depicting a target vehicle and associated image capturing functionalities. The interface 1950 may include a "live view" of image data that is captured, in real-time, by an image sensor of the associated electronic device. Further, the interface 1950 may include an instruction 1951 that instructs the individual to capture a front right view of the target vehicle, as well as a shutter selection 1952 that, upon selection, causes the electronic device to generate an image from the image data captured by the image sensor. In the example embodiment as illustrated in FIG. 19A, the "live view" may depict the front right view of the target vehicle and, in response to the user selecting the shutter selection 1952, the interface 1950 may display a confirmation 1953 that the image was captured. The interface 1950 may further include a transmit selection 1954 that, upon selection, may cause the electronic device to transmit the captured image (as well as any previously-captured images) to the server via the network connection.

Figure 19B:
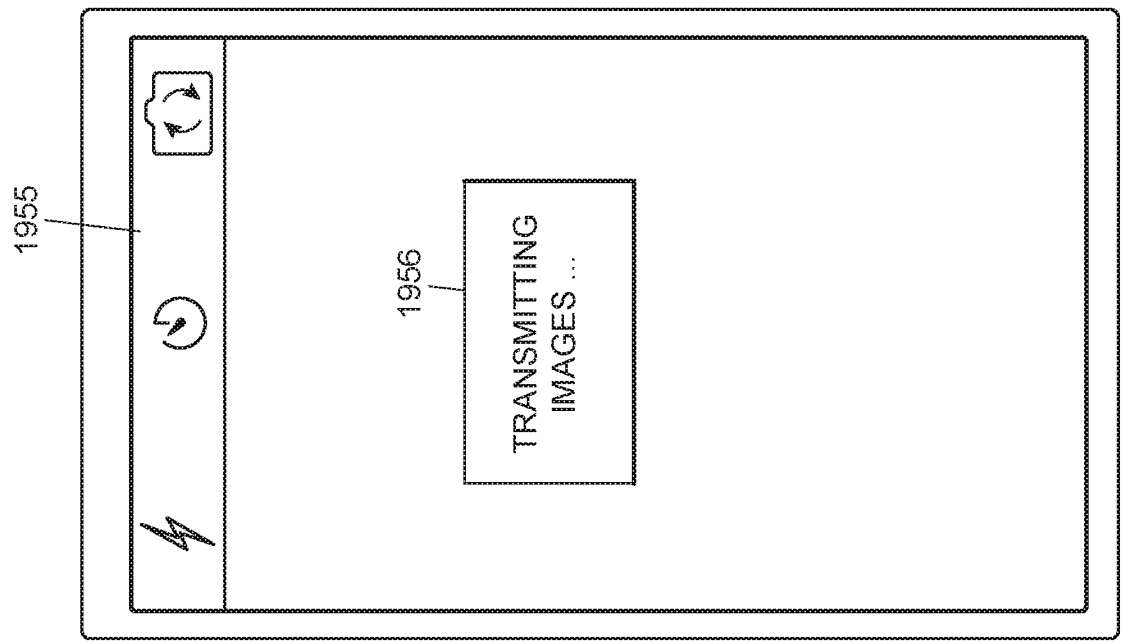

In response to the individual selecting the transmit selection 1954, the electronic device may display an interface 1955 as depicted in FIG. 19B. The interface 1955 may include a status 1956 indicating that the electronic device is transmitting the captured image(s). After receiving the image(s) from the electronic device, the server may analyze the image(s) to identify the target vehicle depicted in the image(s) and determine whether the quality and/or characteristics of the image(s) at least meet the threshold criteria for the corresponding base image model, as discussed herein.

Figure 19D:
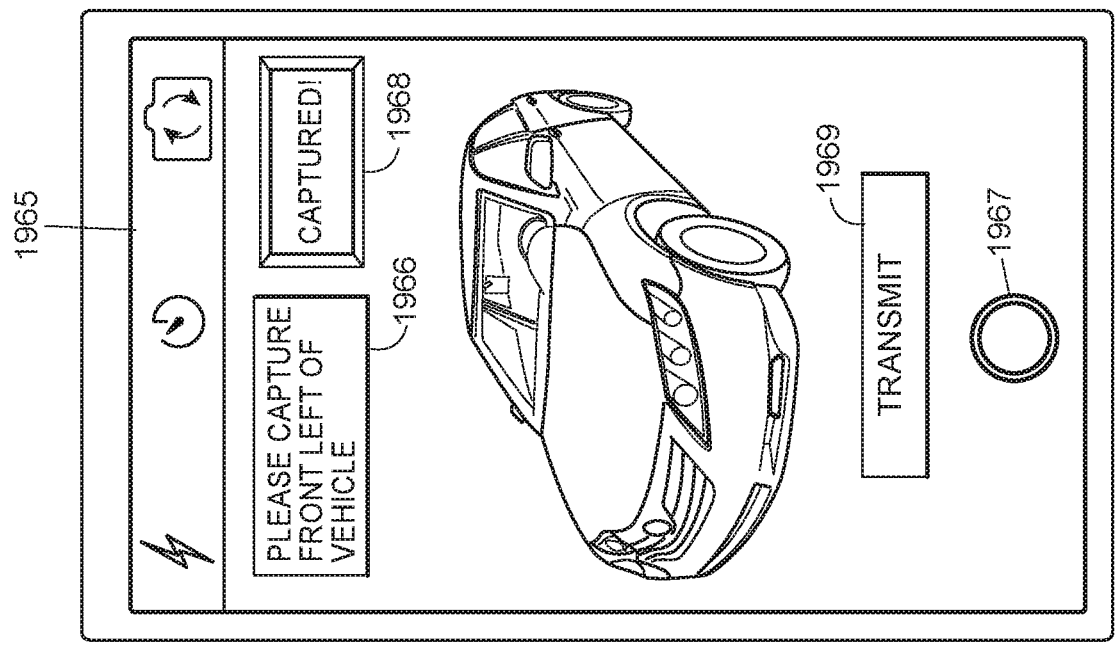
Figure 19C:
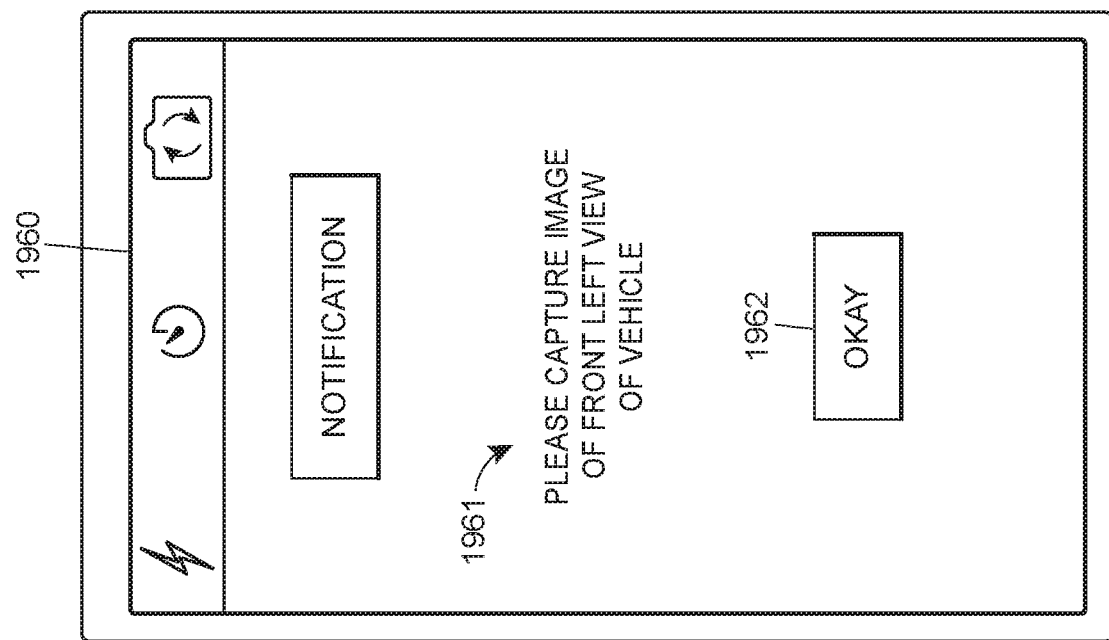

FIG. 19C illustrates an example interface 1960 depicting a notification 1961 that the electronic device may receive from the server as a result of the image analysis performed by the server. In particular, the notification 1961 may instruct the individual to capture an image of the front left view of the target vehicle. In this scenario, the server may have determined that the front left view of the target vehicle either was missing from the initially-transmitted image(s) or that an image of the front left view of the target vehicle was of unacceptable quality (or was deficient in some other regard), and that a proper front left view is needed for proper image analysis according to the corresponding base image model.

The interface 1960 may include an "okay" selection 1962 that, upon selection, may cause the electronic device to display an interface 1965 as illustrated in FIG. 19D. Similar to the interface 1950, the interface 1965 may include a "live view" of image data that is captured, in real-time, by an image sensor of the electronic device. Further, the interface 1965 may include an instruction 1966 that instructs the individual to capture a front left view of the target vehicle, as well as a shutter selection 1967 that, upon selection, causes the electronic device to generate an image from the image data captured by the image sensor. In the example embodiment as illustrated in FIG. 19D, the "live view" may depict the front left view of the target vehicle and, in response to the user selecting the shutter selection 1967, the interface 1965 may display a confirmation 1968 that the image was captured. The interface 1965 may further include a transmit selection 1969 that, upon selection, may cause the electronic device to transmit the captured image to the server via the network connection. Accordingly, the server may analyze the captured image to determine whether the threshold criteria for the corresponding base image model is fulfilled.

The following additional considerations apply to the foregoing discussion. Throughout this specification, plural instances may implement components, operations, or structures described as a single instance. Although individual operations of one or more routines or methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms or units. Any of these modules, units, components, etc. may constitute either software modules (e.g., code stored on a non-transitory machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the hardware terms used herein should be understood to encompass tangible entities, be that entities that are physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules or routines can provide information to, and receive information from, other hardware and/or software modules and routines. Accordingly, the described hardware modules may be regarded as being communicatively coupled. Where multiple of such hardware or software modules exist contemporaneously, communications may be achieved through signal transmission (e.g., over appropriate circuits, lines and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a plant environment, an office environment or as a server farm), while in other embodiments the processors may be distributed across a number of locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "application," an "algorithm" or a "routine" is a self-consistent sequence of operations or similar processing leading to a desired result. In this context, applications, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs may be used for implementing an image processing application and system for configuring and executing the change detection techniques disclosed herein. Thus, while particular embodiments and applications have been illustrated and described herein, it is to be understood that the disclosed embodiments are not limited to the precise construction and components disclosed herein. Various modifications, changes and variations, which will be apparent to those skilled in the art, may be made in the arrangement, operation and details of the methods and structure disclosed herein without departing from the spirit and scope defined in the claims.

What is claimed:

1. A method performed by an image processing system, comprising:
   obtaining a source image that includes an image of a damaged vehicle;
   applying, by a computing device, an image processor component of the image processing system to the source image, including:
      selecting a particular base object model corresponding to the damaged vehicle from a plurality of base object models, each base object model of the plurality of base object models depicting (i) a respective vehicle, of a plurality of vehicles, in an undamaged condition and (ii) a respective plurality of surface area segments of the respective vehicle in the undamaged condition, the respective vehicle in the undamaged condition corresponding to the particular base object model being a particular undamaged vehicle;

selecting, based on the selected particular base object model, a plurality of different convolutional filters, each different convolutional filter corresponding to a different landmark of the particular base object model;

applying the plurality of different convolutional filters to the source image to determine a depiction of a plurality of surface segments of the damaged vehicle, the depicted plurality of surface area segments of the damaged vehicle corresponding to the depicted respective plurality of surface area segments of the particular undamaged vehicle;

for each depicted surface area segment of the damaged vehicle, selecting a different plurality of convolutional neural networks (CNNs), each CNN included in the selected different plurality of CNNs having been trained on images of a respective surface area segment of the particular base object model to detect a different type of damage to the respective surface area segment of the particular base object model, each different type of damage included in a set of damage types including dents, scratches, creases, bends, cracks, scuffs, scrapes, missing parts, and folds;

analyzing the image of the damaged vehicle using the particular base object model and the selected different plurality of CNNs associated with the particular base object model to determine a set of changes to the damaged vehicle, including:

detecting, by utilizing one or more CNNs of the selected different plurality of CNNs associated with the particular base object model, one or more changes to the respective surface area segments corresponding to the one or more CNNs; and generating, based on the detected one or more changes to the respective surface area segments, a plurality of values corresponding to damage to the damaged vehicle, each value included in the plurality of values respectively corresponding to respective damage at a respective location on a corresponding surface area segment of the damaged vehicle;

based on the generated plurality of values corresponding to the damage to the damaged vehicle, identifying, by the computing device, one or more parts of the damaged vehicle needing repair or replacement; and generating an indication of the identified one or more parts of the damaged vehicle needing repair or replacement; and providing the indication of the identified one or more parts to at least one of a user interface or another computing device.

2. The method of claim 1, further comprising ordering the one or more parts.

3. The method of claim 1, wherein applying the image processor component to the source image that includes the image of the damaged vehicle further comprises generating a composite, three-dimensional image of the damaged vehicle from a plurality of two-dimensional images, the plurality of two-dimensional images including the source image.

4. The method of claim 3, further comprising aligning the composite, three-dimensional image of the damaged vehicle with a three-dimensional model of an undamaged vehicle, the three-dimensional model corresponding to the particular base object model.

5. The method of claim 4, wherein aligning the composite, three-dimensional image of the damaged vehicle with the three-dimensional model of the undamaged vehicle comprises isolating the image of the damaged vehicle from the source image.

6. The method of claim 1, wherein identifying the one or more parts of the damaged vehicle needing repair or replacement based on the generated plurality of values comprises filtering a set of vehicle parts of the damaged vehicle and selecting the one or more parts from the filtered set of vehicle parts based on at least some of the generated plurality of values.

7. The method of claim 1, wherein identifying the one or more parts of the damaged vehicle needing repair or replacement based on the generated plurality of values comprises predicting, using a predictive parts model, the one or more parts of the damaged vehicle needing repair or replacement, including providing at least one value of the generated plurality of values as an input to the predictive parts model and receiving an indication of the one or more parts of the damaged vehicle needing repair or replacement from an output of the predictive parts model.

8. The method of claim 1, wherein identifying the one or more parts of the damaged vehicle needing repair or replacement is based on two or more values included in the generated plurality of values, the two or more values corresponding to adjacent surface area segments of the particular base object model.

9. The method of claim 1, wherein identifying the one or more parts of the damaged vehicle needing repair or replacement comprises selecting either (i) one or more individual parts, or (ii) an integral unit including the one or more individual parts based on at least one of an availability of the one or more individual parts or an availability of the integral unit.

10. The method of claim 1, wherein identifying the one or more parts of the damaged vehicle needing repair or replacement comprises selecting either (i) one or more individual parts, or (ii) an integral unit including the one or more individual parts based on at least one of a cost of the one or more individual parts or a cost of the integral unit.

11. The method of claim 1, wherein:
the selected different plurality of CNNs further includes at least one CNN trained on images of the respective surface area segment of the particular base object model to determine a presence or a degree of damage at the respective surface area segment; and the each value included in the generated plurality of values is indicative of at least one of: a determined degree of severity of damage at the respective location, a type of damage at the respective location, or a likelihood of an occurrence of damage at the respective location.

12. The method of claim 1, further comprising determining at least one of a cost of or a time interval for repairing the damaged vehicle based on the one or more parts, and providing an indication of the at least one of cost of or the time interval for repairing the damaged vehicle to at least one of the user interface or the another computing device.

13. The method of claim 12, further comprising:
determining an insurance cost corresponding to the damaged vehicle, the insurance cost comprising at least one of a cost of an insurance claim corresponding to the damaged vehicle, an out-of-pocket cost for an insured party, or a cost of a supplement to the insurance claim corresponding to damaged vehicle; and providing an indication of the insurance cost to at least one of the user interface or the another computing device.

14. The method of claim 13, wherein determining the insurance cost corresponding to the damaged vehicle comprises:
provided, by the computing device, at least one value of the generated plurality of values to a prediction model that has been generated based on historical vehicle claim data of a plurality of vehicles; and
receiving, from the prediction model, a prediction of the insurance cost corresponding to the damaged vehicle.

15. The method of claim 1, wherein at least one of:
the method is integrally performed by the image processing system exclusive of any user input; or
obtaining the source image comprises obtaining a source image captured by a mobile device.

16. The method of claim 1, wherein:
the image processing system is a back-end system including the image processor component, the computing device, and one or more memories storing respective indications of respective vehicle parts included in the set of vehicle parts of the vehicle; and
the at least one of the user interface or the another computing device is included in another system that is communicatively connected to the back-end system.

17. The method of claim 16, wherein the image processor component generates the plurality of values corresponding to the damage to the vehicle based on historical data stored at the back-end system, the historical data including imaging data, parts data, and repair data.

18. The method of claim 1, wherein providing the indication of the identified one or more parts to the at least one of the user interface or the another computing device comprises providing respective indications of respective confidence levels of at least some of the identified one or more parts in conjunction with providing the indication of the identified one or more parts to the at least one of the user interface or the another computing device.

19. The method of claim 1, wherein a respective size of the each surface area segment of the particular base object model varies in accordance with a respective gradient of curvature of a respective location included in the each surface area segment of the particular base object model.

20. The method of claim 1, wherein detecting, by utilizing the one or more CNNs of the selected different plurality of CNNs associated with the particular base object model includes:
applying each CNN of the one or more CNNs to a respective portion of the image of the damaged vehicle corresponding to the respective surface segment area corresponding to the each CNN of the one or more CNNs, including overlaying a two-dimensional area surrounding the respective portion of the image of the damaged vehicle with the each CNN of the one or more CNNs.

* * * * *